(12) United States Patent
Raghavan et al.

(10) Patent No.: US 12,451,978 B2
(45) Date of Patent: Oct. 21, 2025

(54) NEAR-FIELD MEASUREMENTS FOR FAR-FIELD CALIBRATION OF ANTENNA ARRAYS

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 18/182,754

(22) Filed: Mar. 13, 2023

(65) Prior Publication Data

US 2024/0313869 A1 Sep. 19, 2024

(51) Int. Cl.
*H04B 17/13* (2015.01)
*H04B 17/21* (2015.01)
*H04B 17/327* (2015.01)

(52) U.S. Cl.
CPC ............. *H04B 17/13* (2015.01); *H04B 17/21* (2015.01); *H04B 17/327* (2015.01)

(58) Field of Classification Search
CPC ...... H04B 17/13; H04B 17/21; H04B 17/327; H04B 17/12
See application file for complete search history.

(56) References Cited

U.S. PATENT DOCUMENTS

| 2010/0015928 A1* | 1/2010 | Takano | H04B 17/21 |
| | | | 455/73 |
| 2024/0048200 A1* | 2/2024 | Tawa | H04B 7/06 |
| 2025/0080246 A1* | 3/2025 | Vieira | H04B 17/14 |

FOREIGN PATENT DOCUMENTS

CN 208890809 U 5/2019

OTHER PUBLICATIONS

International Search Report and Written Opinion—PCT/US2024/019583—ISA/EPO—Jun. 26, 2024.

* cited by examiner

*Primary Examiner* — Tejis Daya
(74) *Attorney, Agent, or Firm* — Harrity & Harrity, LLP

(57) ABSTRACT

Wireless communications systems, apparatuses, and methods are provided. A method of wireless communication performed by a user equipment (UE) includes receiving, from a wireless communication device located at a first distance from the UE, a plurality of reference signals associated with determining a set of phase values corresponding to antenna elements of an antenna array for reception operations, determining a first set of calibration adjustment coefficients associated with the set of phase values, and transmitting, to a network unit located at a second distance from the UE, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

30 Claims, 11 Drawing Sheets

NEAR-FIELD MEASUREMENTS FOR FAR-FIELD CALIBRATION OF ANTENNA ARRAYS

TECHNICAL FIELD

This application relates to wireless communication systems, and more particularly, to near-field measurements for far-field calibration of antenna arrays with millimeter wave beamforming in wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHZ, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include receiving, from a wireless communication device located at a first distance from the UE, a plurality of reference signals, wherein the plurality of reference signals are associated with determining a set of phase or gain values corresponding to antenna elements of an antenna array for reception operations; determining a first set of calibration adjustment coefficients associated with the set of phase or gain values to be used for transmission operations from the antenna elements of the antenna array at the UE to the wireless communication device located at the first distance from the UE; and transmitting, to a network unit located at a second distance from the UE, a communication signal with phase or gain values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

In an additional aspect of the disclosure, a method of wireless communication performed by a user equipment (UE) may include receiving, from a wireless communication device located at a first distance from the UE, a plurality of first reference signals; receiving, from the wireless communication device located at a second distance from the UE, a plurality of second reference signals, wherein the plurality of first reference signals and the plurality of second reference signals are associated with determining a set of phase or gain values corresponding to antenna elements of an antenna array for reception operations; determining a first set of calibration adjustment coefficients associated with the set of phase or gain values to be used for transmission operations from the antenna elements of the antenna array at the UE to the wireless communication device located at the first distance from the UE; determining a second set of calibration adjustment coefficients associated with the set of phase or gain values to be used for transmission operations from the antenna elements of the antenna array at the UE to the wireless communication device located at the second distance from the UE; and transmitting, to a network unit located at a second distance from the UE, a communication signal with phase or gain values based on at least one of the first set of calibration adjustment coefficients or the second set of calibration adjustment coefficients.

In an additional aspect of the disclosure, a user equipment (UE) may include a memory; a transceiver; and at least one processor coupled to the memory and the transceiver, wherein the UE is configured to: receive, from a wireless communication device located at a first distance from the UE, a plurality of reference signals, wherein the plurality of reference signals are associated with determining a set of phase or gain values corresponding to antenna elements of an antenna array for reception operations; determine a first set of calibration adjustment coefficients associated with the set of phase or gain values to be used for transmission operations from the antenna elements of the antenna array at the UE to the wireless communication device located at the first distance from the UE; and transmit, to a network unit located at a second distance from the UE, a communication signal with phase or gain values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

In an additional aspect of the disclosure, a user equipment (UE) may include a memory; a transceiver; and at least one processor coupled to the memory and the transceiver, wherein the UE is configured to: receive, from a wireless communication device located at a first distance from the UE, a plurality of first reference signals; receive, from the wireless communication device located at a second distance from the UE, a plurality of second reference signals, wherein the plurality of first reference signals and the plurality of second reference signals are associated with determining a set of phase or gain values corresponding to antenna elements of an antenna array for reception operations; determine a first set of calibration adjustment coefficients associated with the set of phase or gain values to be used for transmission operations from the antenna elements of the antenna array at the UE to the wireless communication device located at the first distance from the UE; determine a second set of calibration adjustment coefficients associated with the set of phase or gain values to be used for transmission operations from the antenna elements of the antenna array at the UE to the wireless communication device located at the second distance from the UE; and transmit, to a network unit located at a second distance from the UE, a communication signal with phase or gain values based on at least one of the first set of calibration adjustment coefficients or the second set of calibration adjustment coefficients.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
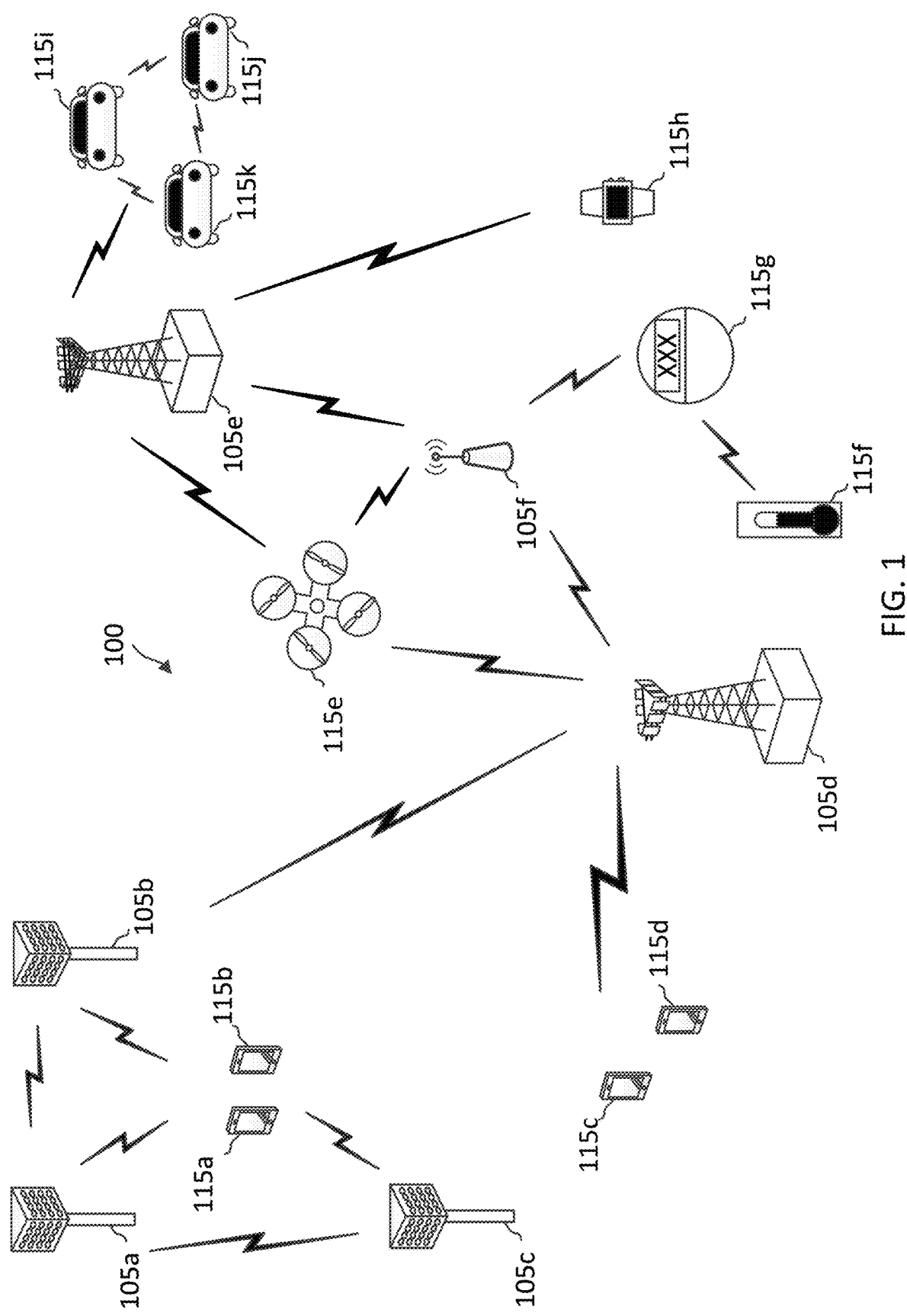
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHZ BW. For other various indoor wideband implementations, using a TDD over the unlicensed portion of the 5 GHz band, the subcarrier spacing may occur with 60 KHz over a 160 MHz BW. Finally, for various deployments transmitting with mmWave components at a TDD of 28 GHZ, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHZ bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHZ bandwidth, e.g., for listen before talk (LBT) based channel accessing, in an unlicensed band. A BS may configure a sidelink resource pool over one or multiple 20 MHZ LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type. The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. In some aspects, the UE 115h may harvest energy from an ambient environment associated with the UE 115h. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115 may receive, from a wireless communication device located at a first distance from the UE 115, a plurality of reference signals, wherein the plurality of reference signals are associated with determining a set of phase values corresponding to antenna elements of an antenna array for reception operations. The UE 115 may determine a first set of calibration adjustment coefficients associated with the set of phase values to be used for transmission operations from the antenna elements of the antenna array at the UE 115 to the wireless communication device located at the first distance from the UE 115. The UE 115 may transmit, to the BS 105 located at a second distance from the UE 115, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE 115, respectively.

In some aspects, the UE 115 may receive, from a wireless communication device located at a first distance from the UE 115, a plurality of first reference signals. The UE 115 may receive, from the wireless communication device located at a second distance from the UE 115, a plurality of second reference signals, wherein the plurality of first reference signals and the plurality of second reference signals are associated with determining a set of phase values corresponding to antenna elements of an antenna array for reception operations. The UE 115 may determine a first set of calibration adjustment coefficients associated with the set of phase values to be used for transmission operations from the antenna elements of the antenna array at the UE 115 to the wireless communication device located at the first distance from the UE 115. The UE 115 may determine a second set of calibration adjustment coefficients associated with the set of phase values to be used for transmission operations from the antenna elements of the antenna array at the UE 115 to the wireless communication device located at the second distance from the UE 115. The UE 115 may transmit, to the BS 105 located at a second distance from the UE 115, a communication signal with phase values based on at least one of the first set of calibration adjustment coefficients or the second set of calibration adjustment coefficients.

Figure 2:
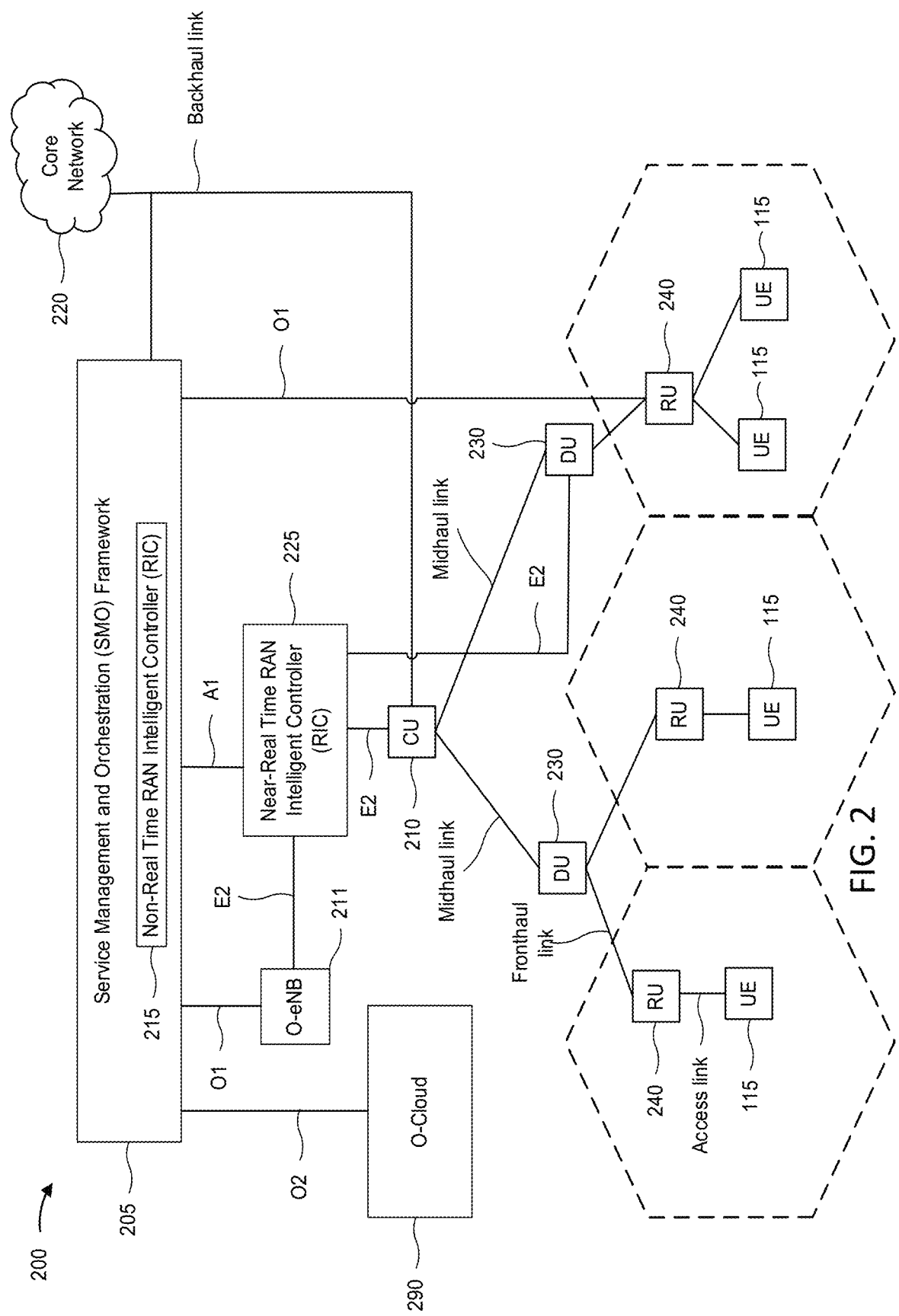
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, the UE 115 may transmit, to the RU 240, a plurality of reference signals, wherein the plurality of reference signals is associated with a first set of phase and gain values to be used with a first antenna array at the UE 115 for uplink transmissions. The UE 115 may receive, from the RU 240, signals used to determine calibration coefficients associated with the first set of phase and gain values for the first antenna array. The UE 115 may transmit, to the RU 240, a communication signal based on the calibration coefficients associated with the first set of phase and gain values and calibration coefficients associated with a second set of phase and gain values, wherein the calibration coefficients associated with the second set of phase and gain values are interpolated from the calibration coefficients associated with the first set of phase and gain values.

In some aspects, the UE 115 may transmit, to a RU 240, a plurality of reference signals, wherein the plurality of reference signals is associated with a first set of phase and gain values to be used with a first antenna array at the UE 115 for uplink transmissions. The UE 115 may receive, from the network unit 105, signals used to determine calibration coefficients associated with the first set of phase and gain values for the first antenna array. The UE 115 may receive, from the network unit 105, signals used to determine the calibration coefficients associated with a second set of phase and gain values. The UE 115 may transmit, to the RU 240, a communication signal based on the calibration coefficients associated with the first set of phase and gain values and the calibration coefficients associated with the second set of phase and gain values.

In some aspects, the UE 115 may receive, from a wireless communication device located at a first distance from the UE 115, a plurality of reference signals, wherein the plurality of reference signals are associated with determining a set of phase values corresponding to antenna elements of an antenna array for reception operations. The UE 115 may determine a first set of calibration adjustment coefficients associated with the set of phase values to be used for transmission operations from the antenna elements of the antenna array at the UE 115 to the wireless communication device located at the first distance from the UE 115. The UE 115 may transmit, to the RU 240 located at a second distance from the UE 115, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE 115, respectively.

In some aspects, the UE 115 may receive, from a wireless communication device located at a first distance from the UE 115, a plurality of first reference signals. The UE 115 may receive, from the wireless communication device located at a second distance from the UE 115, a plurality of second reference signals, wherein the plurality of first reference signals and the plurality of second reference signals are associated with determining a set of phase or gain values corresponding to antenna elements of an antenna array for reception operations. The UE 115 may determine a first set of calibration adjustment coefficients associated with the set of phase values to be used for transmission operations from the antenna elements of the antenna array at the UE 115 to the wireless communication device located at the first distance from the UE 115. The UE 115 may determine a second set of calibration adjustment coefficients associated with the set of phase or gain values to be used for transmission operations from the antenna elements of the antenna array at the UE 115 to the wireless communication device located at the second distance from the UE 115. The UE 115 may transmit, to the RU 240 located at a second distance from the UE 115, a communication signal with phase or gain values based on at least one of the first set of calibration adjustment coefficients or the second set of calibration adjustment coefficients.

Figure 3:
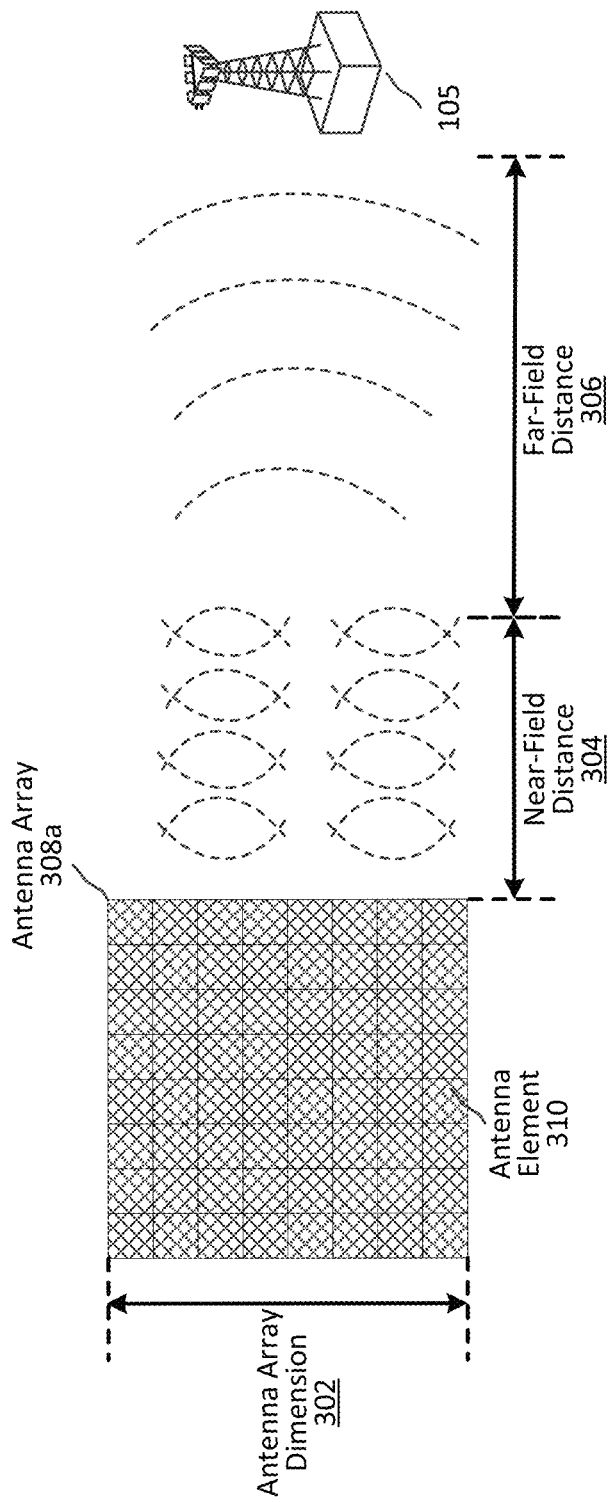
FIG. 3 illustrates near-field communication and far-field communication in wireless communications according to some aspects of the present disclosure.

FIG. 3 illustrates near-field distance 304 communication and far-field distance 306 communication in wireless communications according to some aspects of the present disclosure. In some aspects, a UE may include one or more antenna arrays 308 at multiple positions in the UE. For example, the antenna array(s) 308 may be positioned along different edges (e.g., sides) of the UE for spatial diversity. In the example of FIG. 3 a single antenna array 308a is shown. However, the UE may include any number of antenna array(s) 308. The antenna array(s) 308 may be positioned parallel and/or orthogonal to one another. Each antenna array 308 may include multiple antenna elements 310. For example, antenna array 308a may include 8 rows of antenna elements 310 and 8 columns of antenna elements for a total of 64 antenna elements 310.

In some aspects, the UE may use the antenna array 308a for communicating with the network unit 105. Depending on the distance between the UE and the network unit 105, the UE may communicate with the network unit 105 in the near-field distance 304 region or the far-field distance 306 region. The near-field distance 304 region may include the reactive near-field region and/or the radiating near-field region (e.g., Fresnel region).

In some aspects, the far-field distance may be based on a Fraunhofer distance. In this regard, the Fraunhofer distance may be defined as $2D^2/\lambda$, where D is the largest antenna array dimension 302 and $\lambda$ is the wavelength of the communication signal. In some aspects, the UE may transmit the communication signal with phase values based on a second set of calibration adjustment coefficients. In some aspects, the second set of calibration adjustment coefficients may be based on a first set of calibration adjustment coefficients and a distance adjustment factor. The distance adjustment factor may be based on the near-field distance 304 from the network unit 105 to the antenna array 308a and the far-field distance from the network unit 105 to the antenna array 308a. The UE may determine phase or gain values for communicating with the network unit 105 at a far-field distance 306 using the second set of calibration adjustment coefficients. The second set of calibration adjustment coefficients may be based on (e.g., extrapolated from) the first set of calibration adjustment coefficients and the distance adjustment factor.

Figure 4:
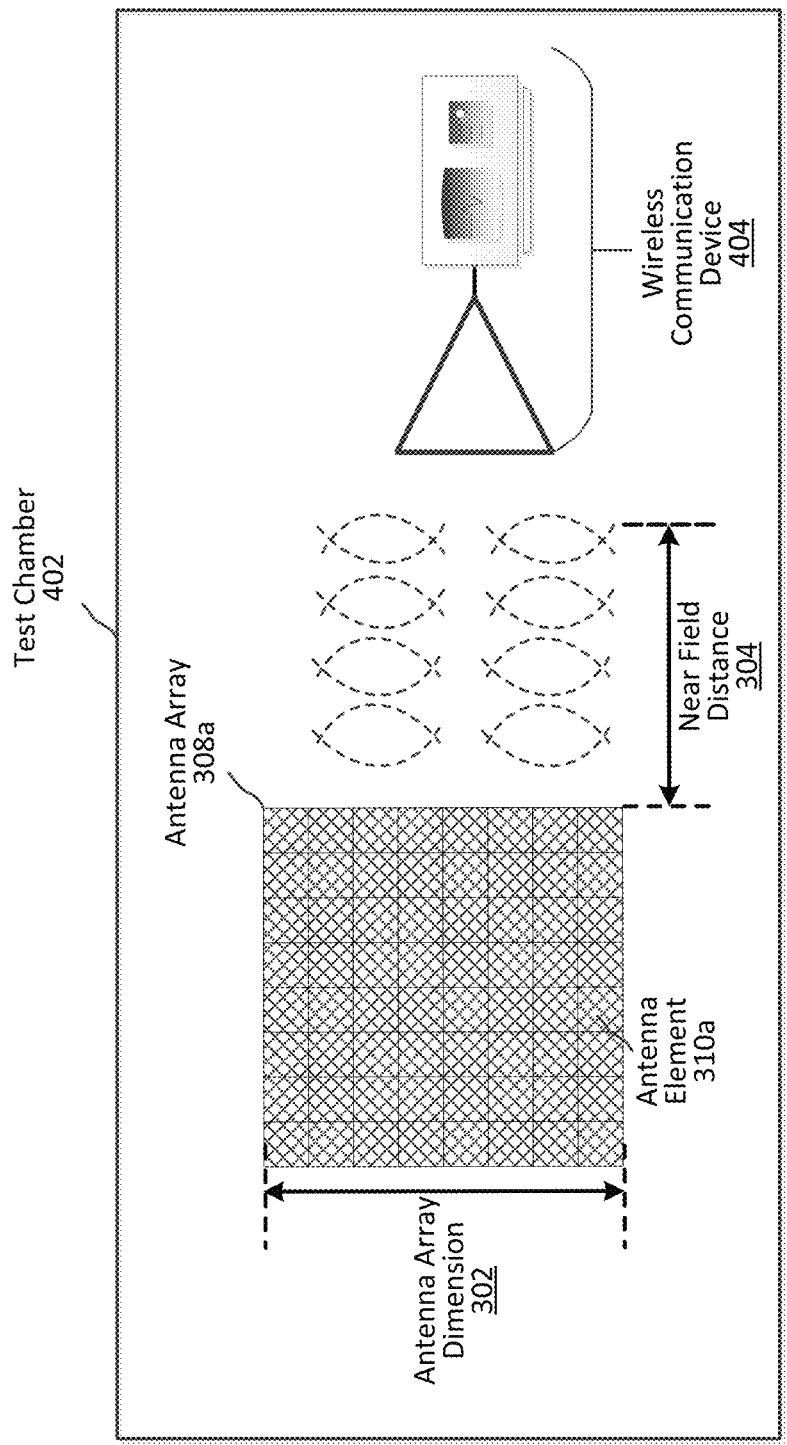
FIG. 4 illustrates a near-field calibration method in wireless communications according to some aspects of the present disclosure.

FIG. 4 illustrates a near-field calibration method in wireless communications according to some aspects of the present disclosure. In some aspects, a UE (e.g., the UE 115, the UE 800), may receive a plurality of reference signals from a wireless communication device 404 located at a near-field distance 304 from an antenna array 308a of the UE. In this regard, the UE may receive a plurality of sounding reference signals (SRSs), demodulation reference signals (DMRSs), phase tracking reference signals (PTRSs), or other suitable reference signals from the wireless communication device 404. In some aspects, the wireless communication device 404 may comprise test equipment, a base station emulator, an antenna tester, a signal generator, antenna array calibration equipment, or other suitable wireless communication device. In some aspects, the near-field distance 304 may be based on near-field behavior of the antenna array 308a. In this regard, the near-field distance 304 may include a reactive near-field region and/or a radiating near-field region (e.g., a Fresnel region).

In some aspects, the plurality of reference signals may be used to determine a set of phase values corresponding to antenna elements 310 of the antenna array 308 for receiving communication signals. The antenna array 308a may be an antenna array 308a of one or more antenna arrays used by the UE for reception of downlink communications from a network unit (e.g., the network unit 900, the BS 105, the RU 240, the DU 230, and/or the CU 210) and transmission of uplink communications to the network unit. In this regard, the downlink communications may include PDCCH communications, PDSCH communications, PBCH communications, and/or other suitable downlink communications. The uplink transmissions may include PUCCH communications, PUSCH communications, PRACH communications, and/or other suitable uplink communications.

In some aspects, the UE may include one or more antenna arrays 308 at multiple positions in the UE. Each antenna array 308 may include multiple antenna elements 310. In the example, of FIG. 3 a single antenna array 308a is shown. However, the UE may include any number of antenna arrays (e.g., antenna array 308b, 308c, etc. not shown in FIG. 4 for simplicity) and/or any number of antenna elements 310 in each antenna array 308. Each antenna array 308 may include multiple antenna elements 310. For example, antenna array 308a may include 8 rows of antenna elements 310 and 8 columns of antenna elements for a total of 64 antenna elements 310.

In some aspects, the UE may receive the reference signals in a test chamber 402 (e.g., an anechoic chamber). The UE and the wireless communication device 404 may be configured in the test chamber 402 in order to calibrate the antenna array 308a using reference signals transmitted over the near-field distance 304.

In some aspects, the UE may determine a first set of calibration adjustment coefficients associated with the set of phase values. The calibration adjustment coefficients may be used for transmission operations from the UE to the wireless communication device 404 located at the near-field distance 304 from the UE.

In some aspects, the calibration adjustment coefficients may be used by the UE to increase a signal quality of a transmitted beam for uplink transmissions. For example, signal processing over an antenna array 308a during beamforming may include adjusting a phase of signals corresponding to each of the antenna elements 310 in the array. In some aspects, gain adjustments may be used for improving directionality of beams from the antenna elements 310, such as to control (e.g., reduce) side lobes and control (e.g., increase) the main lobe. Calibration adjustment coefficients used in beamforming may be particularly advantageous in millimeter wave communications to coherently combine energy and overcome high path, propagation, and blockage losses at the higher frequencies (e.g., FR2, FR3, FR4, FR5 frequencies) of millimeter wave communications. Upon performing gain and/or phase calibration for beamforming in the near-field and far-field, the antenna elements 310 may operate with more accurate gain and/or phase settings for a more accurate beam pattern.

In some aspects, the UE may transmit a communication signal to a network unit (e.g., the network unit 900, the BS 105, the RU 240, the DU 230, and/or the CU 210) located at a far-field distance from the UE (e.g., when the UE is not in the test chamber 402 and is deployed in a wireless network (e.g., the wireless network 100, 200)). In this regard, the communication signal may include a PUCCH communication, a PUSCH communication, a PRACH communication, and/or other suitable uplink communication(s). In some aspects, the far-field distance may be greater than the near-field distance. In some aspects, the far-field distance 306 may be based on a Fraunhofer distance defined as $2D^2/\lambda$, where D is the largest dimension (antenna array dimension 302) of the antenna array 308a and $\lambda$ is the wavelength of the communication signal.

In some aspects, the UE may transmit the communication signal with phase values based on a second set of calibration adjustment coefficients. In some aspects, the second set of calibration adjustment coefficients may be based on the first set of calibration adjustment coefficients and a distance adjustment factor based on the near-field distance 304 from the wireless communication device 404 to the UE and the far-field distance 306 from the network unit to the UE. The UE may calibrate the phase values of the antenna array using the wireless communication device 404 (e.g., antenna calibration equipment) in test chamber 402 (e.g., anechoic chamber) at a first distance (e.g., near-field distance 304). The UE may then determine phase values for communicating with the network unit (e.g., a base station 105, a radio unit 240) at a second distance (e.g., a far-field distance 306) using the second set of calibration adjustment coefficients. The second set of calibration adjustment coefficients may be based on (e.g., extrapolated from) the first set of calibration adjustment coefficients and the distance adjustment factor as described above and below.

In some aspects, the first set of calibration adjustment coefficients may be determined using the test chamber 402 setup and the second set of calibration adjustment coefficients may be based on the first set of calibration adjustment coefficients and the distance adjustment factor due to size limitations of the test chamber 402. Since the far-field distance 306 is based on the wavelength of the reference signals, the test chamber 402 may not be large enough to separate the UE from the wireless communication device 404 (e.g., the antenna calibration equipment) in order to calibrate the second set of calibration adjustment coefficients in the test chamber 402 at the second distance (e.g., far-field distance 306).

In some aspects, the second set of calibration adjustment coefficients may be equal to the sum of the first set of calibration adjustment coefficients and the distance adjustment factor. In some aspects, the distance adjustment factor may have a value of zero. In this case, the first set of calibration adjustment coefficients will equal the second set of calibration adjustment coefficients. In some aspects, the distance adjustment factor may be based on a resolution of a phase shifter of the UE. For example, when the resolution of the phase shifter is low (e.g., 1 bit phase shifter, 2 bit phase shifter corresponding to a large quantized phase uncertainty), the distance adjustment factor may have a value of zero.

In some aspects, the second set of calibration adjustment coefficients may be based on the first set of calibration adjustment coefficients and a common distance adjustment factor across a subset or all phase settings of the antenna array 308a. For example, when the phase shifter has $2^n$ phase settings where n is the number of bits controlling the phase shifter, a subset or all of the $2^n$ values of the second set of calibration adjustment coefficients may be based on the first set of calibration adjustment coefficients and a common distance adjustment factor. This approach may be extended to a subset or all of the antenna elements 310 of the antenna array 308a. In some aspects, the first set of calibration adjustment coefficients and/or the second set of calibration adjustment coefficients may be stored in memory (e.g., memory 804) of the UE in the form of a lookup table.

In some aspects, the common distance adjustment factor may be based on the near-field/far-field response of the UE and network unit. The common distance adjustment factor may be a constant value for a subset or all phase settings of the antenna array 308a. In some aspects, the common distance adjustment factor may be an average of distance adjustment factors. For example, the common distance adjustment factor may be based on an average of the far-field distance 306 of the UE.

In some aspects, the common distance adjustment factor may be based on empirical results of link margins measured over a time span. For example, the UE may use a set of common distance adjustment factors over time and determine (e.g., learn) which common distance adjustment factor provides the highest link margin. The UE may use a range of common distance adjustment factors and determine which distance adjustment factor provides the highest RSRP.

Figure 5:
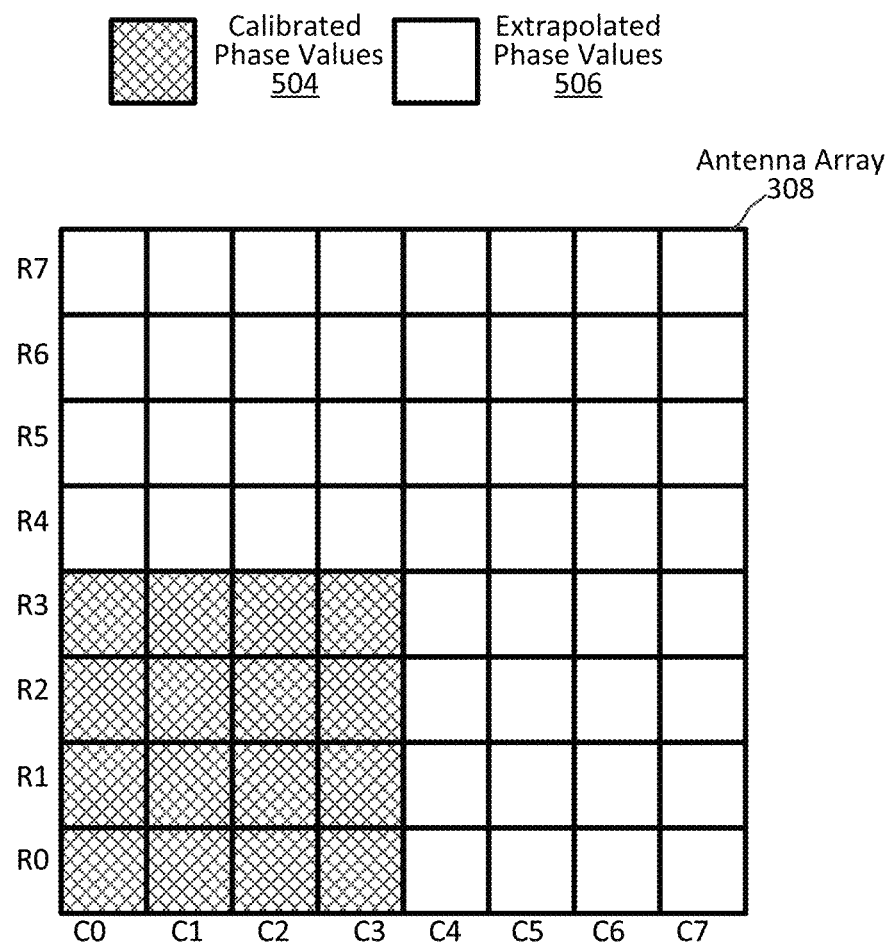
FIG. 5 illustrates an antenna array in wireless communications according to some aspects of the present disclosure.

FIG. 5 illustrates an antenna array 308 in wireless communications according to some aspects of the present disclosure. In some aspects, the UE may receive the plurality of first reference signals using a subset of the antenna elements of the antenna array 308. Since the second distance (e.g., the far-field distance) is based on the largest dimension of the antenna array 308, using a subset of the antenna elements may allow the subset of antenna elements to be calibrated in both the near-field and far-field in the test chamber. For example, referring to FIG. 5, the antenna array 308 may include an 8×8 array of antenna elements arranged in a row and column structure. The rows may be designated as rows R0 to R7. The columns may be designated as columns C0 to C7. The UE may determine the calibrated phase values 504 based on the subset of antenna elements in rows R0 to R3 and columns C0 to C3. Although the present example includes using a subset of 16 antenna elements out of the total of 64 antenna elements, the present disclosure is not limited and any number of antenna elements may be calibrated. The UE may then use the calibration adjustment coefficients determined for antenna elements in rows R0 to R3 and columns C0 to C3 and extrapolate them out to the entire antenna array 308 in rows R0 to R7 and columns C0 to C7. The UE may transmit the communication signal to the network unit via all the antenna elements of the antenna array using the calibrated phase values 504 determined for antenna elements in rows R0 to R3 and columns C0 to C3 and the extrapolated phase values 506 for the rest of the antenna elements.

Figure 6:
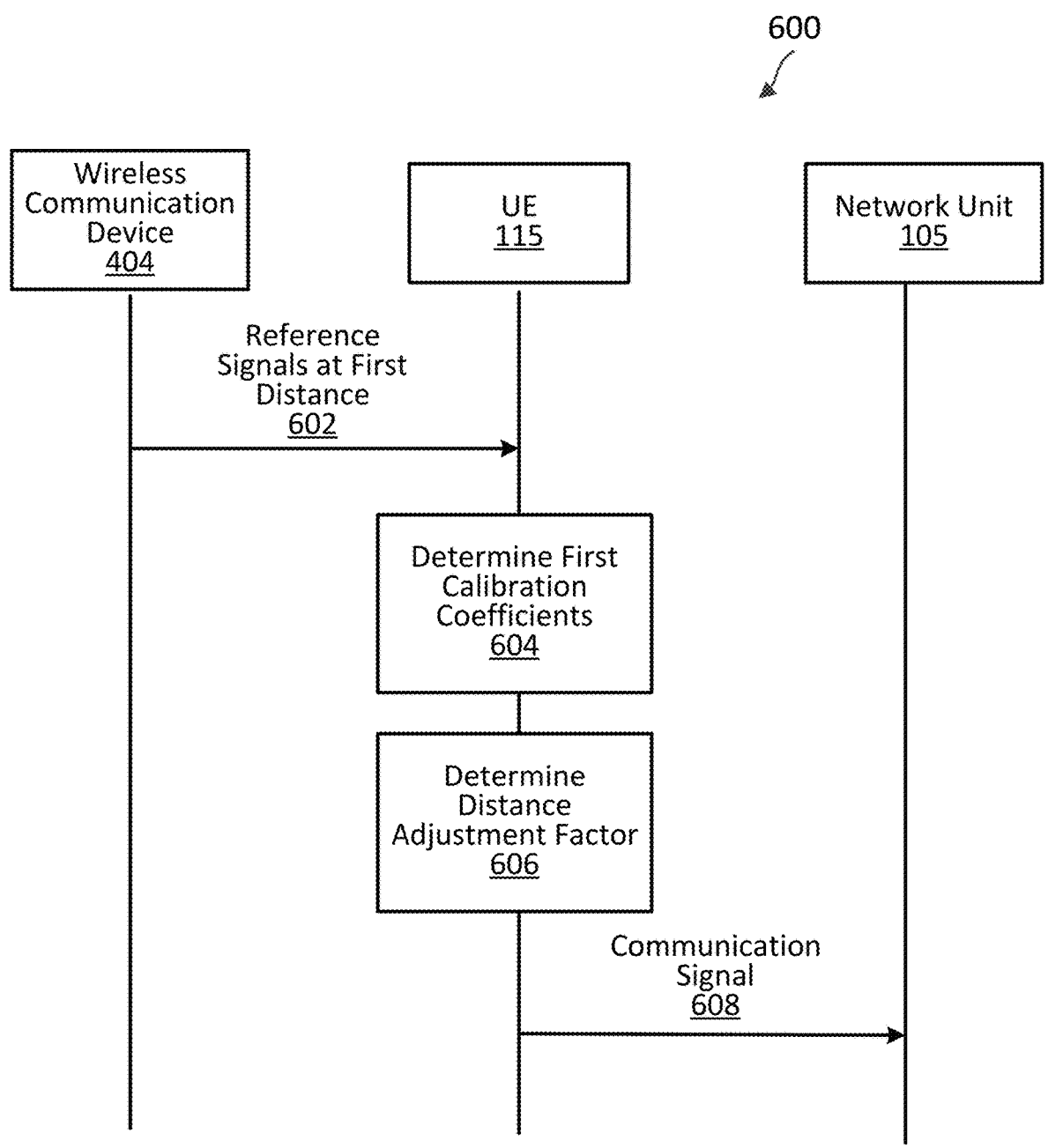
FIG. 6 is a signal flow diagram of a communication method according to some aspects of the present disclosure.

FIG. 6 is a flow diagram of a communication method 600 according to some aspects of the present disclosure. Aspects of the method 600 may be executed by a computing device (e.g., a processor, processing circuit, and/or other suitable component) of a wireless communication device or other suitable means for performing the actions. For example, a wireless communication device, such as the UE 115 or the UE 800 may utilize one or more components, such as the processor 802, the memory 804, the near-field calibration module 808, the transceiver 810, the modem 812, and the one or more antennas 816, to execute aspects of method 600. The method 600 may employ similar mechanisms as in the networks 100 and 200 and the aspects and actions described with respect to FIGS. 3-5. As illustrated, the method 600 includes a number of enumerated actions, but the method 600 may include additional actions before, after, and in between the enumerated actions. In some aspects, one or more of the enumerated actions may be omitted or performed in a different order.

At action 602, the method 600 includes the UE 115 receiving a plurality of reference signals from a wireless communication device 404 located at a first distance (e.g., a near-field distance) from the UE 115. In this regard, the UE 115 may receive a plurality of sounding reference signals (SRSs), demodulation reference signals (DMRSs), phase tracking reference signals (PTRSs), or other suitable reference signals from the wireless communication device 404. In some aspects, the wireless communication device 404 may comprise test equipment, a base station emulator, an antenna tester, a signal generator, antenna array calibration equipment, or other suitable wireless communication device. In some aspects, the first distance may be based on near-field behavior of the antenna array.

In some aspects, the plurality of reference signals may be used to determine a set of phase values corresponding to antenna elements of an antenna array for receiving communication signals. The antenna array may be an antenna array of one or more antenna arrays used by the UE 115 for reception of downlink communications from the network unit 105 and transmission of uplink communications to the network unit 105. In this regard, the downlink communications may include PDCCH communications, PDSCH communications, PBCH communications, and/or other suitable downlink communications. The uplink transmissions may include PUCCH communications, PUSCH communications, PRACH communications, and/or other suitable uplink communications.

In some aspects, the UE 115 may include one or more antenna arrays at multiple positions in the UE 115. Each antenna array may include multiple antenna elements. For example, each antenna array may include a single row/column of antenna elements and/or multiple rows/columns of antenna elements. In some aspects, the UE 115 may receive the reference signals from the wireless communication device 404 in an anechoic chamber. The UE 115 and the wireless communication device 404 may be configured in the anechoic chamber in order to calibrate the antenna array using reference signals transmitted over the near-field distance.

At action 604, the method 600 includes the UE 115 determining a first set of calibration adjustment coefficients associated with the set of phase values. The calibration adjustment coefficients may be used for transmission operations from the UE 115 to the wireless communication device 404 and/or network unit 105 located at the first distance from the UE 115.

In some aspects, the calibration adjustment coefficients may be used by the UE 115 to increase a signal quality of a transmitted beam for uplink transmissions. Calibration adjustment coefficients used in beamforming may be particularly advantageous in millimeter wave communications to coherently combine energy and overcome high path, propagation, and blockage losses at the higher frequencies (e.g., FR2, FR3, FR4, FR5 frequencies) of millimeter wave communications. Upon performing gain and/or phase calibration for beamforming in the near-field and far-field, the antenna elements may operate with more accurate gain and/or phase settings for a more accurate beam pattern.

At action 606, the method 600 includes the UE 115 determining a distance adjustment factor. In some aspects, the UE may transmit a communication signal with phase values based on a second set of calibration adjustment coefficients. The second set of calibration adjustment coefficients may be based on the first set of calibration adjustment coefficients determined at action 604 and a distance adjustment factor based on the first distance from the wireless communication device 404 to the UE 115 and the second distance from the network unit 105 to the UE 115. The UE 115 may calibrate the phase values of the antenna array using the wireless communication device 404 (e.g., antenna calibration equipment) in a test chamber (e.g., anechoic chamber) at a first distance (e.g., a near-field distance). The UE 115 may then determine phase values for communicating with the network unit 105 at a second distance (e.g., a far-field distance) using the second set of calibration adjustment coefficients. The second set of calibration adjustment coefficients may be based on (e.g., extrapolated from) the first set of calibration adjustment coefficients and the distance adjustment factor.

In some aspects, the first set of calibration adjustment coefficients may be determined using the test chamber setup and the second set of calibration adjustment coefficients may be based on the first set of calibration adjustment coefficients and the distance adjustment factor due to size limitations of the test chamber. Since the far-field distance is based on the wavelength of the reference signals, the test chamber may not be large enough to separate the UE from the wireless communication device (e.g., the antenna calibration equipment) in order to calibrate the second set of calibration adjustment coefficients in the test chamber at the second distance.

In some aspects, the second set of calibration adjustment coefficients may be equal to the sum of the first set of calibration adjustment coefficients and the distance adjustment factor. In some aspects, the distance adjustment factor may have a value of zero. In this case, the first set of calibration adjustment coefficients will equal the second set of calibration adjustment coefficients. In some aspects, the distance adjustment factor may be based on a resolution of a phase shifter of the UE 115. For example, when the resolution of the phase shifter is low (e.g., 1 bit phase shifter, 2 bit phase shifter), the distance adjustment factor may have a value of zero.

In some aspects, the second set of calibration adjustment coefficients may be based on the first set of calibration adjustment coefficients and a common distance adjustment factor across a subset or all phase settings of the antenna element. For example, when the phase shifter has $2^n$ phase settings where n is the number of bits controlling the phase shifter, a subset or all of the $2^n$ values of the second set of calibration adjustment coefficients may be based on the first set of calibration adjustment coefficients and a common distance adjustment factor. This approach may be extended to a subset or all of the antenna elements of the antenna array. In some aspects, the first set of calibration adjustment coefficients and/or the second set of calibration adjustment coefficients may be stored in memory (e.g., memory 804) of the UE 115 in the form of a lookup table.

In some aspects, the common distance adjustment factor may be based on the near-field/far-field response of the UE 115 and network unit 105. The common distance adjustment factor may be a constant value for a subset or all phase settings of the antenna element. In some aspects, the common distance adjustment factor may be an average of distance adjustment factors. For example, the common distance adjustment factor may be based on an average of the far-field distance of the UE 115. The common distance adjustment factor may be based on empirical results of link margins measured over a time span. For example, the UE 115 may use different common distance adjustment factors over time and determine (e.g., learn) which common distance adjustment factor provides the highest link margin. The UE 115 may use a range of common distance adjustment factors and determine which distance adjustment factor provides the highest RSRP.

Additionally or alternatively, the common distance adjustment factor may be based on the second distance (e.g., the far-field response). For example, the common distance adjustment factor may be proportional to the second distance and/or inversely proportional to the second distance.

In some aspects, the phase calibration of the antenna element(s) may be affected by certain events/conditions associated with the UE 115. In this regard, the distance adjustment factor may be further based on certain events/conditions associated with the UE 115. In some aspects, the distance adjustment factor may be further based on a temperature of the UE 115. Since the temperature of the UE's transceiver (e.g., transceiver 810) may affect the phase or gain values, the distance adjustment factor may be further based on the temperature of the UE 115.

In some aspects, the distance adjustment factor may be further based on a frequency and/or frequency range associated with the communication signal. For example, the distance adjustment factor may be greater for a higher frequency range (e.g., FR2 frequency range) as compared to a lower frequency range (e.g., FR3 frequency range).

In some aspects, the distance adjustment factor may be further based on a gain state associated with the antenna elements. Additionally or alternatively, the distance adjustment factor may be further based on the difference between the first distance and the second distance.

In some aspects, the UE may receive an indicator from the network unit 105 indicating the distance adjustment factor. In this regard, the UE 115 may receive the indicator from the network unit 105 via DCI, an RRC communication, a MAC CE communication, a PDCCH communication, a PDSCH communication, or other suitable communication.

In some aspects, the UE 115 may determine a third set of calibration adjustment coefficients associated with a set of gain values to be used for the transmission operations. The UE 115 may transmit the communication signal with gain values based on a fourth set of calibration adjustment coefficients. The fourth set of calibration adjustment coefficients may be based on the third set of calibration adjustment coefficients and a second distance adjustment factor.

At action 608, the method 600 includes the UE 115 transmitting a communication signal to the network unit 105 located at a second distance from the UE 115. In this regard, the communication signal may include a PUCCH communication, a PUSCH communication, a PRACH communication, and/or other suitable uplink communication(s). The UE may transmit the communication signal with phase values based on the second set of calibration adjustment coefficients determine at action 606. The second set of calibration adjustment coefficients may be based on the first set of calibration adjustment coefficients and a distance adjustment factor based on the first distance from the wireless communication device 404 to the UE 115 and the second distance from the network unit 105 to the UE 115. In some aspects, the second distance may be greater than the first distance.

In some aspects, the UE 115 may transmit an indicator to the network unit 105 indicating a self-calibration capability associated with the antenna elements of the antenna array. In this regard, the UE 115 may transmit the indicator to the network unit 105 via UCI, an RRC communication, a MAC CE communication, a PUCCH communication, a PUSCH communication, or other suitable communication. In some aspects, the UE 115 may self-calibrate one or more of the antenna elements of the antenna array. The UE 115 may self-calibrate one or more of the antenna elements in the near-field. For example, a first antenna element may transmit the reference signal(s) while a second antenna element receives the reference signal(s). The first antenna element may transmit the reference signal(s) to a reflector, the reflector may then reflect the reference signal(s) back to the second antenna element such that the UE 115 may then determine the first set of calibration adjustment coefficients for the near-field.

Figure 7:
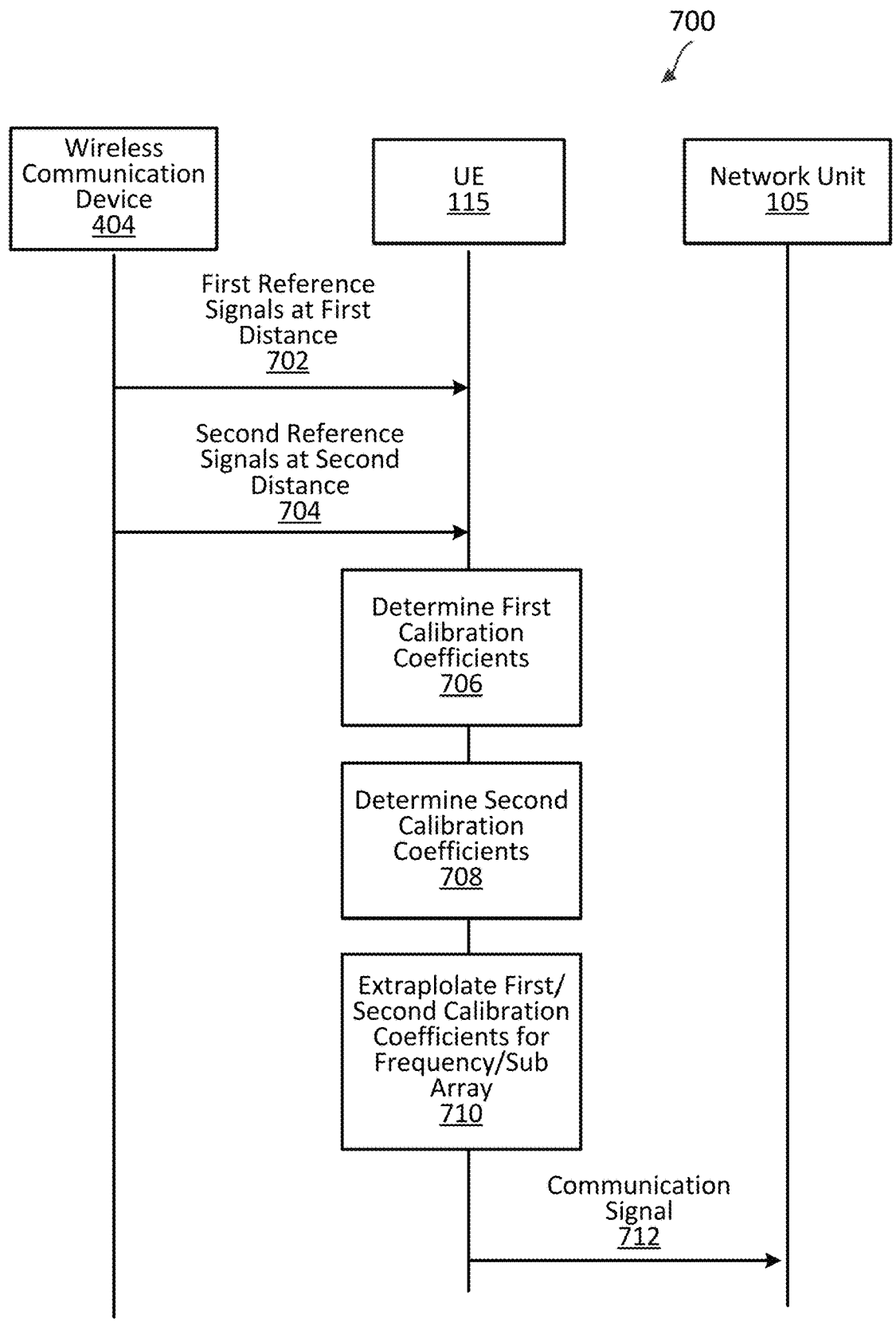
FIG. 7 is a signal flow diagram of a communication method according to some aspects of the present disclosure.

FIG. 7 is a flow diagram of a communication method 700 according to some aspects of the present disclosure. Aspects of the method 700 may be executed by a computing device (e.g., a processor, processing circuit, and/or other suitable component) of a wireless communication device or other suitable means for performing the actions. For example, a wireless communication device, such as the UE 115 or the UE 800 may utilize one or more components, such as the processor 802, the memory 804, the near-field calibration module 808, the transceiver 810, the modem 812, and the one or more antennas 816, to execute aspects of method 700. The method 700 may employ similar mechanisms as in the networks 100 and 200 and the aspects and actions described with respect to FIGS. 3-6. As illustrated, the method 700 includes a number of enumerated actions, but the method 700 may include additional actions before, after, and in between the enumerated actions. In some aspects, one or more of the enumerated actions may be omitted or performed in a different order.

At action 702, the method 700 includes UE 115 receiving a plurality of first reference signals from a wireless communication device located at a first distance (e.g., near-field distance) from the UE 115. In this regard, the UE 115 may receive the plurality of sounding reference signals (SRSs), demodulation reference signals (DMRSs), phase tracking reference signals (PTRSs), or other suitable first reference signals from the wireless communication device 404. In some aspects, the first distance may be based on near-field behavior of the antenna array. In this regard, the near-field may include the reactive near-field region and/or the radiating near-field region (e.g., Fresnel region).

At action 704, the method 700 includes the UE 115 receiving a plurality of second reference signals from the wireless communication device 404 located at a second distance (e.g., far-field distance) from the UE 115. In this regard, the UE may receive the plurality of SRSs, DMRSs, PTRSs, or other suitable second reference signals from the wireless communication device 404. In some aspects, the second distance may be based on far-field behavior of the antenna array. The second distance may be greater than the first distance. The second distance may be based on a Fraunhofer distance.

In some aspects, the plurality of first reference signals and second reference signals may be used to determine a set of phase or gain values corresponding to antenna elements of an antenna array for receiving and/or transmitting communication signals. The antenna array may be an antenna array of one or more antenna arrays used by the UE for reception of downlink communications and transmission of uplink communications to the network unit. In some aspects, the UE may include one or more antenna arrays at multiple positions in the UE 115.

In some aspects, the UE 115 may receive the first reference signals and the second reference signals from the wireless communication device 404 in an anechoic chamber. The UE and the wireless communication device may be configured in the anechoic chamber in order to calibrate the antenna array using first reference signals transmitted over the first distance (e.g., the near-field distance) and second reference signals transmitted over the second distance (e.g., the far-field distance).

At action 706, the method 700 includes the UE 115 determining a first set of calibration adjustment coefficients associated with the set of phase values. The calibration adjustment coefficients may be used for transmission operations from the UE 115 to the wireless communication device 404 located at the first distance (e.g., the near-field distance) from the UE 115.

At action 708, the method 700 includes the UE 115 determining a second set of calibration adjustment coefficients associated with the set of phase values. The calibration adjustment coefficients may be used for transmission operations from the UE to the wireless communication device 404 located at the second distance (e.g., the far-field distance) from the UE 115.

At action 710, the method 700 includes the UE 115 calibrating the phase values of the antenna array using the wireless communication device 404 in a test chamber (e.g., anechoic chamber) at the first distance (e.g., near-field distance) and the second distance (e.g., far-field distance) at a first frequency (e.g., FR1 frequency, FR2 frequency). In some aspects, the first set of calibration adjustment coefficients and the second set of calibration adjustment coefficients may be determined at the first frequency using the test chamber setup based on the test chamber being large enough to accommodate the UE 115 and the wireless communication device 404 (e.g., antenna calibration equipment) being separated by the second distance in the chamber. Since the far-field distance is based on the wavelength of the reference signals, the test chamber may not be large enough to separate the UE from the wireless communication device at the second distance at the second (higher) frequency.

The UE 115 may then determine phase values for communicating with the network unit at a second frequency (e.g., an FR4 frequency) using a third set of calibration adjustment coefficients. The second frequency may be higher than the first frequency. The third set of calibration adjustment coefficients may be based on (e.g., extrapolated from) the first set of calibration adjustment coefficients and/or the second set of calibration adjustment coefficients.

At action 712, the method 700 includes the UE transmitting a communication signal to the network unit 105 located at a second distance from the UE 115. In this regard, the communication signal may include a PUCCH communication, a PUSCH communication, a PRACH communication, and/or other suitable uplink communication(s). In some aspects, the UE 115 may transmit the communication signal with phase values based on the first set of calibration adjustment coefficients and/or the second set of calibration adjustment coefficients. In this regard, the UE 115 may transmit the communication signal at the first frequency to the network unit with phase values based on the first set of calibration adjustment coefficients when the UE 115 is located at or about the first distance from the network unit. The UE 115 may transmit the communication signal at the first frequency to the network unit 105 with phase values based on the second set of calibration adjustment coefficients when the UE 115 is located at or about the second distance from the network unit. The UE 115 may transmit the communication signal at the second (higher) frequency to the network unit 105 with phase values based on the third set calibration adjustment coefficients extrapolated from the first and/or second sets of calibration adjustment coefficients.

Figure 8:
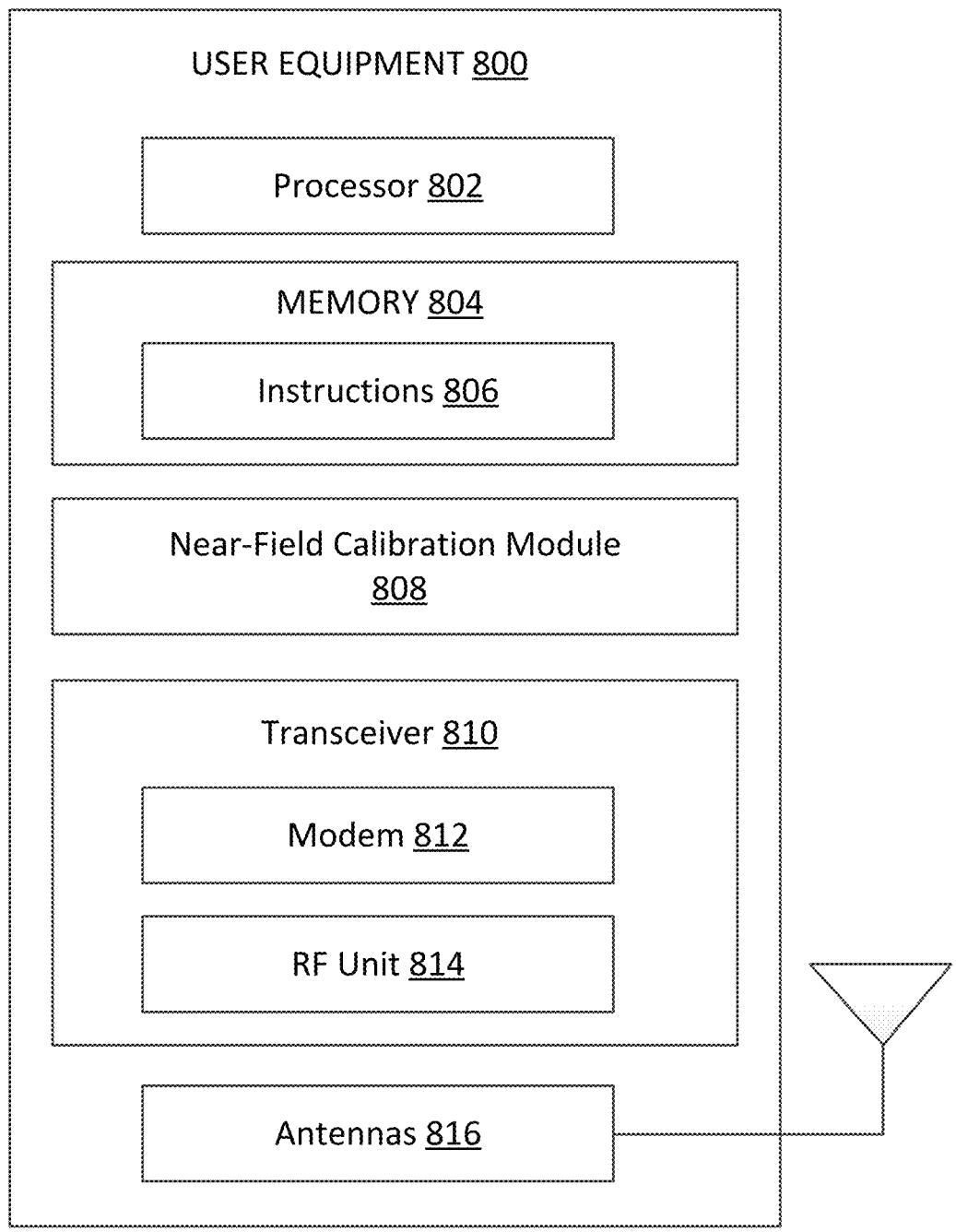
FIG. 8 is a block diagram of an exemplary user equipment (UE) according to some aspects of the present disclosure.

FIG. 8 is a block diagram of an exemplary UE 800 according to some aspects of the present disclosure. The UE 800 may be the UE 115 in the network 100, or 200 as discussed above. As shown, the UE 800 may include a processor 802, a memory 804, a near-field calibration module 808, a transceiver 810 including a modem subsystem 812 and a radio frequency (RF) unit 814, and one or more antennas 816. These elements may be coupled with each other and in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with aspects of the present disclosure, for example, aspects of FIGS. 3-7. Instructions 806 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The near-field calibration module 808 may be implemented via hardware, software, or combinations thereof. For example, the near-field calibration module 808 may be implemented as a processor, circuit, and/or instructions 806 stored in the memory 804 and executed by the processor 802. In some aspects, the near-field calibration module 808 may implement the aspects of FIGS. 3-7. For example, the near-field calibration module 808 may receive, from a wireless communication device located at a first distance from the UE 800, a plurality of reference signals, wherein the plurality of reference signals are associated with determining a set of phase values corresponding to antenna elements of an antenna array for reception operations. The near-field calibration module 808 may determine a first set of calibration adjustment coefficients associated with the set of phase values to be used for transmission operations from the antenna elements of the antenna array at the UE 800 to the wireless communication device located at the first distance from the UE 800. The near-field calibration module 808 may transmit, to a network unit 900 located at a second distance from the UE 800, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit 900 from the UE 800, respectively.

In some aspects, the near-field calibration module 808 may receive, from a wireless communication device located at a first distance from the UE 800, a plurality of first reference signals. The near-field calibration module 808 may receive, from the wireless communication device located at a second distance from the UE 800, a plurality of second reference signals, wherein the plurality of first reference signals and the plurality of second reference signals are associated with determining a set of phase values corresponding to antenna elements of an antenna array for reception operations. The near-field calibration module 808 may determine a first set of calibration adjustment coefficients associated with the set of phase values to be used for transmission operations from the antenna elements of the antenna array at the UE 800 to the wireless communication device located at the first distance from the UE 800. The near-field calibration module 808 may determine a second set of calibration adjustment coefficients associated with the set of phase values to be used for transmission operations from the antenna elements of the antenna array at the UE 800 to the wireless communication device located at the second distance from the UE 800. The near-field calibration module 808 may transmit, to a network unit located at a second distance from the UE 800, a communication signal with phase values based on at least one of the first set of calibration adjustment coefficients or the second set of calibration adjustment coefficients.

As shown, the transceiver 810 may include the modem subsystem 812 and the RF unit 814. The transceiver 810 may be configured to communicate bi-directionally with other devices, such as the BSs 105 and/or the UEs 115. The modem subsystem 812 may be configured to modulate and/or encode the data from the memory 804 and the according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

In some instances, the UE 800 may include multiple transceivers 810 implementing different RATs (e.g., NR and LTE). In some instances, the UE 800 may include a single transceiver 810 implementing multiple RATs (e.g., NR and LTE). In some instances, the transceiver 810 may include various components, where different combinations of components may implement RATs.

Figure 9:
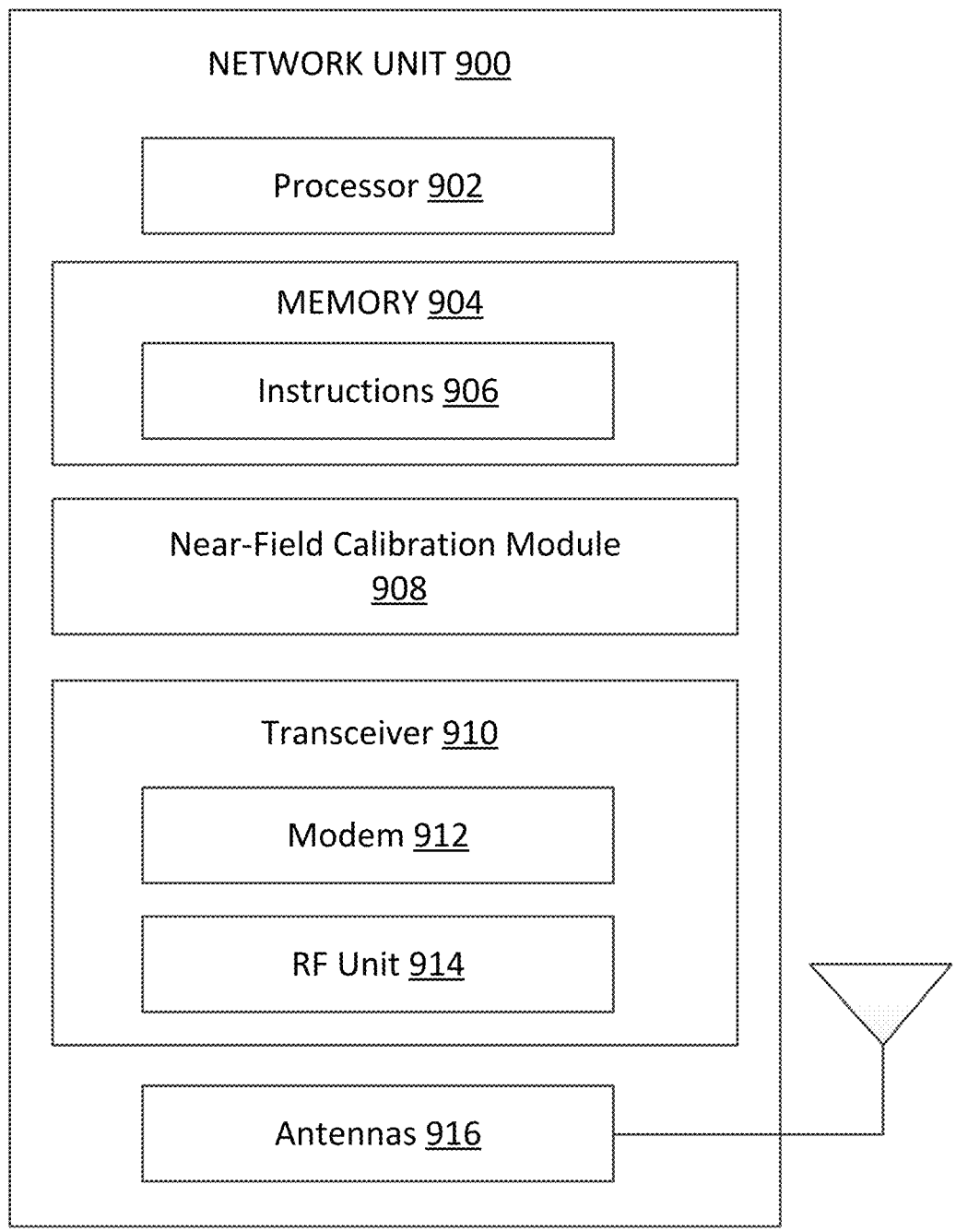
FIG. 9 is a block diagram of an exemplary network unit according to some aspects of the present disclosure.

FIG. 9 is a block diagram of an exemplary network unit 900 according to some aspects of the present disclosure. The network unit 900 may be the BS 105, the CU 210, the DU 230, or the RU 240, as discussed above. As shown, the network unit 900 may include a processor 902, a memory 904, a near-field calibration module 908, a transceiver 910 including a modem subsystem 912 and a RF unit 914, and one or more antennas 916. These elements may be coupled with each other and in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 3-7. Instructions 906 may also be referred to as code, which may be interpreted broadly to include any type of computer-readable statement(s).

The near-field calibration module 908 may be implemented via hardware, software, or combinations thereof. For example, the near-field calibration module 908 may be implemented as a processor, circuit, and/or instructions 906 stored in the memory 904 and executed by the processor 902.

In some aspects, the near-field calibration module 908 may implement the aspects of FIGS. 3-7. For example, the near-field calibration module 908 may receive, from a UE 800 located at a second distance from the network unit 900, a communication signal with phase values based on at least one of the first set of calibration adjustment coefficients or the second set of calibration adjustment coefficients. Additionally or alternatively, the near-field calibration module 908 may be implemented in any combination of hardware and software, and may, in some implementations, involve, for example, processor 902, memory 904, instructions 906, transceiver 910, and/or modem 912.

As shown, the transceiver 910 may include the modem subsystem 912 and the RF unit 914. The transceiver 910 may be configured to communicate bi-directionally with other devices, such as the UEs 115 and/or UE 800. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the network unit 900 to enable the network unit 900 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, a configuration indicating a plurality of sub-slots within a slot according to aspects of the present disclosure. The antennas 916 may further receive data messages transmitted from other devices and provide the received data messages for processing and/or demodulation at the transceiver 910. The antennas 916 may include multiple antennas of similar or different designs in order to sustain multiple transmission links.

In some instances, the network unit 900 may include multiple transceivers 910 implementing different RATs (e.g., NR and LTE). In some instances, the network unit 900 may include a single transceiver 910 implementing multiple RATs (e.g., NR and LTE). In some instances, the transceiver 910 may include various components, where different combinations of components may implement RATs.

Figure 10:
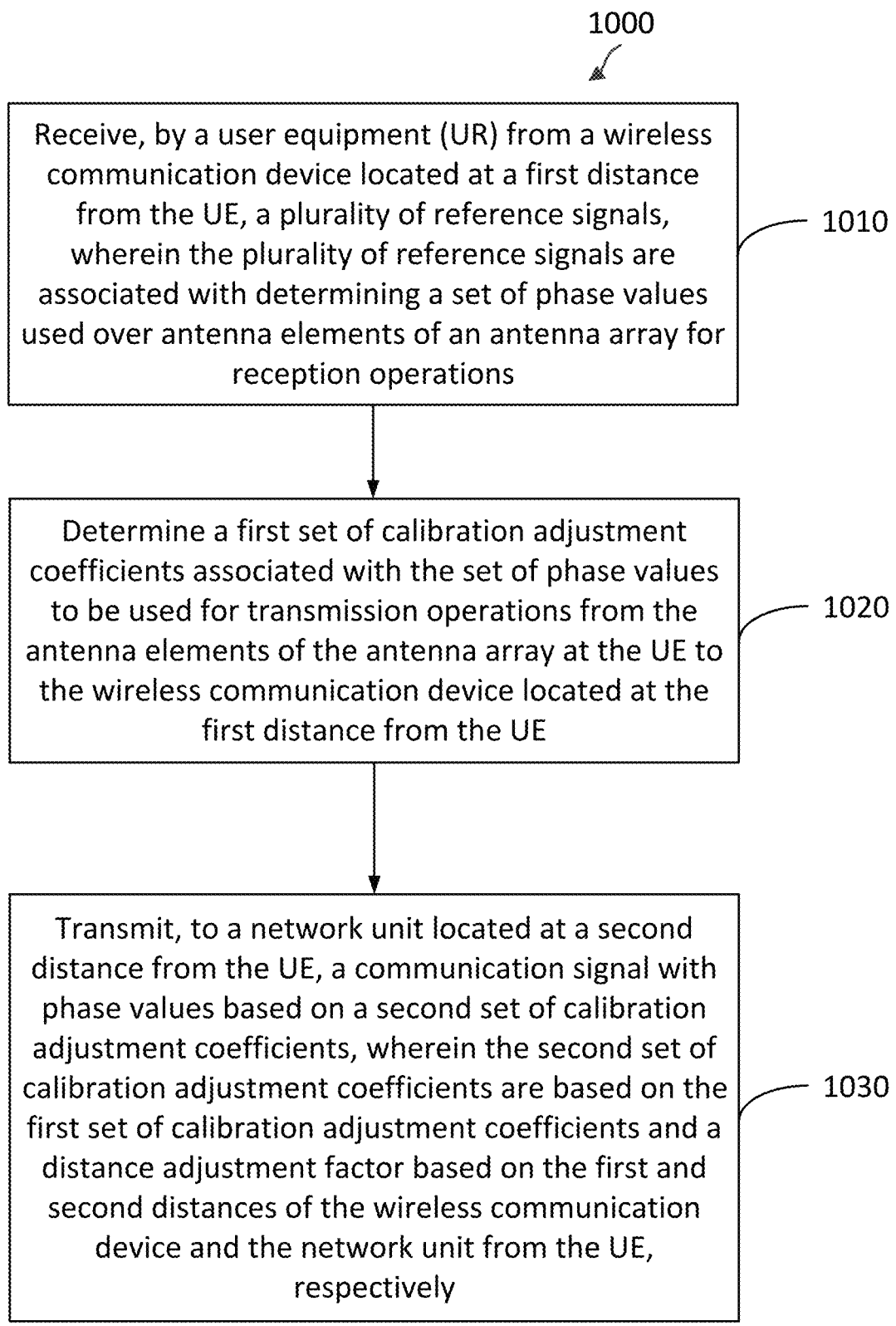
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the actions. For example, a wireless communication device, such as the UE 115 or the UE 800, may utilize one or more components, such as the processor 802, the memory 804, the near-field calibration module 808, the transceiver 810, the modem 812, and the one or more antennas 816, to execute aspects of method 1000. The method 1000 may employ similar mechanisms as in the networks 100 and 200 and the aspects and actions described with respect to FIGS. 3-7. As illustrated, the method 1000 includes a number of enumerated actions, but the method 1000 may include additional actions before, after, and in between the enumerated actions. In some aspects, one or more of the enumerated actions may be omitted or performed in a different order.

At action 1010, the method 1000 includes a user equipment (UE) (e.g., the UE 115, the UE 800), receiving a plurality of reference signals from a wireless communication device located at a first distance from the UE. In this regard, the UE may receive a plurality of sounding reference signals (SRSs), demodulation reference signals (DMRSs), phase tracking reference signals (PTRSs), or other suitable reference signals from the wireless communication device. In some aspects, the wireless communication device may comprise test equipment, a base station emulator, an antenna tester, a signal generator, antenna array calibration equipment, or other suitable wireless communication device. In some aspects, the first distance may be based on near-field behavior of the antenna array. In this regard, the near-field may include the reactive near-field region and/or the radiating near-field region (e.g., Fresnel region).

some aspects, the plurality of reference signals may be used to determine a set of phase values corresponding to antenna elements of an antenna array for receiving communication signals. The antenna array may be an antenna array of one or more antenna arrays used by the UE for reception of downlink communications from the network unit and transmission of uplink communications to the network unit. In this regard, the downlink communications may include PDCCH communications, PDSCH communications, PBCH communications, and/or other suitable downlink communications. The uplink transmissions may include PUCCH communications, PUSCH communications, PRACH communications, and/or other suitable uplink communications.

In some aspects, the UE may include one or more antenna arrays at multiple positions in the UE. For example, the antenna arrays may be positioned along different edges (e.g., sides) of the UE for spatial diversity. The antenna arrays may be positioned parallel and/or orthogonal to one another. Each antenna array may include multiple antenna elements. For example, each antenna array may include a single row of antenna elements and/or multiple rows of antenna elements.

In some aspects, the UE may receive the reference signals in an anechoic chamber. The UE and the wireless communication device may be set up in the anechoic chamber in order to calibrate the antenna array using reference signals transmitted over the near-field distance.

At action 1020, the method 1000 includes the UE determining a first set of calibration adjustment coefficients associated with the set of phase values. The calibration adjustment coefficients may be used for transmission operations from the UE to the wireless communication device located at the first distance from the UE.

In some aspects, the calibration adjustment coefficients may be used by the UE to increase a signal quality of a transmitted beam for uplink transmissions. For example, signal processing over an array of antenna elements during beamforming may include adjusting a phase of signals corresponding to each of the antenna elements in the array. In some aspect, gain adjustments may be used for improving directionality of beams from the antenna elements, such as to control (e.g., reduce) side lobes and control (e.g., increase) the main lobe. Calibration adjustment coefficients used in beamforming may be particularly advantageous in millimeter wave communications to coherently combine energy and overcome high path, propagation, and blockage losses at the higher frequencies (e.g., FR2, FR3, FR4, FR5 frequencies) of millimeter wave communications. Upon performing gain and/or phase calibration for beamforming in the near-field and far-field, the antenna elements may operate with more accurate gain and/or phase settings for a more accurate beam pattern.

At action 1030, the method 1000 includes the UE transmitting a communication signal to a network unit (e.g., the network unit 900, the BS 105, the RU 240, the DU 230, and/or the CU 210) located at a second distance from the UE. In this regard, the communication signal may include a PUCCH communication, a PUSCH communication, a PRACH communication, and/or other suitable uplink communication(s). In some aspects, the second distance may be greater than the first distance. In some aspects, the second distance may be based on a Fraunhofer distance. In this regard, the Fraunhofer distance may be defined as $2D^2/\lambda$, where D is the largest dimension of the antenna array and $\lambda$ is the wavelength of the communication signal.

In some aspects, the UE may transmit the communication signal with phase values based on a second set of calibration adjustment coefficients. In some aspects, the second set of calibration adjustment coefficients may be based on the first set of calibration adjustment coefficients and a distance adjustment factor based on the first distance from the wireless communication device to the UE and the second distance from the network unit to the UE. The UE may calibrate the phase values of the antenna array using the wireless communication device (e.g., antenna calibration equipment) in a test chamber (e.g., anechoic chamber) at a first distance (e.g., a near-field distance). The UE may then determine phase values for communicating with the network unit (e.g., a base station 105, a radio unit 240) at a second distance (e.g., a far-field distance) using the second set of calibration adjustment coefficients. The second set of calibration adjustment coefficients may be based on (e.g., extrapolated from) the first set of calibration adjustment coefficients and the distance adjustment factor as described above and below.

In some aspects, the first set of calibration adjustment coefficients may be determined using the test chamber setup and the second set of calibration adjustment coefficients may be based on the first set of calibration adjustment coefficients and the distance adjustment factor due to size limitations of the test chamber. Since the far-field distance is based on the wavelength of the reference signals, the test chamber may not be large enough to separate the UE from the wireless communication device (e.g., the antenna calibration equipment) in order to calibrate the second set of calibration adjustment coefficients in the test chamber at the second distance.

In some aspects, the second set of calibration adjustment coefficients may be equal to the sum of the first set of calibration adjustment coefficients and the distance adjustment factor. In some aspects, the distance adjustment factor may have a value of zero. In this case, the first set of calibration adjustment coefficients will equal the second set of calibration adjustment coefficients. In some aspects, the distance adjustment factor may be based on a resolution of a phase shifter of the UE. For example, when the resolution of the phase shifter is low (e.g., 1 bit phase shifter, 2 bit phase shifter), the distance adjustment factor may have a value of zero.

In some aspects, the second set of calibration adjustment coefficients may be based on the first set of calibration adjustment coefficients and a common distance adjustment factor across a subset or all phase settings of the antenna element. For example, when the phase shifter has 2 n phase settings where n is the number of bits controlling the phase shifter, a subset or all of the 2 n values of the second set of calibration adjustment coefficients may be based on the first set of calibration adjustment coefficients and a common distance adjustment factor. This approach may be extended to a subset or all of the antenna elements of the antenna array. In some aspects, the first set of calibration adjustment coefficients and/or the second set of calibration adjustment coefficients may be stored in memory (e.g., memory 804) in the form of a lookup table.

In some aspects, the common distance adjustment factor may be based on the near-field/far-field response of the UE and network unit. The common distance adjustment factor may be a constant value for a subset or all phase settings of the antenna element. In some aspects, the common distance adjustment factor may be an average of distance adjustment factors. For example, the common distance adjustment factor may be based on an average of the far-field distance of the UE. The common distance adjustment factor may be based on empirical results of link margins measured over a time span. For example, the UE may use different common distance adjustment factors over time and determine (e.g., learn) which common distance adjustment factor provides the highest link margin. The UE may use a range of common distance adjustment factors and determine which distance adjustment factor provides the highest RSRP.

Additionally or alternatively, the common distance adjustment factor may be based on the second distance (e.g., the far-field response). For example, the common distance adjustment factor may be proportional to the second distance and/or inversely proportional to the second distance.

In some aspects, the phase calibration of the antenna element(s) may be affected by certain events/conditions associated with the UE. In this regard, the distance adjustment factor may be further based on certain events/conditions associated with the UE. In some aspects, the distance adjustment factor may be further based on a temperature of the UE. Since the temperature of the UE's transceiver (e.g., transceiver 810) may affect the phase values, the distance adjustment factor may be further based on the temperature of the UE.

In some aspects, the distance adjustment factor may be further based on a frequency and/or frequency range associated with the communication signal. For example, the distance adjustment factor may be greater for a higher frequency range (e.g., FR3 frequency range) as compared to a lower frequency range (e.g., FR2 frequency range).

In some aspects, the distance adjustment factor may be further based on a gain state associated with the antenna elements. Additionally or alternatively, the distance adjustment factor may be further based on the difference between the first distance and the second distance.

In some aspects, the UE may receive an indicator from the network unit indicating the distance adjustment factor. In this regard, the UE may receive the indicator from the network unit via DCI, an RRC communication, a MAC CE communication, a PDCCH communication, a PDSCH communication, or other suitable communication.

In some aspects, the UE may determine a third set of calibration adjustment coefficients associated with a set of gain values to be used for the transmission operations. The UE may transmit the communication signal with gain values based on a fourth set of calibration adjustment coefficients. The fourth set of calibration adjustment coefficients may be based on the third set of calibration adjustment coefficients and a second distance adjustment factor.

In some aspects, the UE may transmit an indicator to the network unit indicating a self-calibration capability associated with the antenna elements of the antenna array. In this regard, the UE may transmit the indicator to the network unit via UCI, an RRC communication, a MAC CE communication, a PUCCH communication, a PUSCH communication, or other suitable communication. In some aspects, the UE may self-calibrate one or more of the antenna elements of the antenna array. The UE may self-calibrate one or more of the antenna elements in the near-field. For example, a first antenna element may transmit the reference signal(s) while a second antenna element receives the reference signal(s). The first antenna element may transmit the reference signal(s) to a reflector, the reflector may then reflect the reference signal(s) back to the second antenna element such that the UE may then determine the first set of calibration adjustment coefficients for the near-field.

Figure 11:
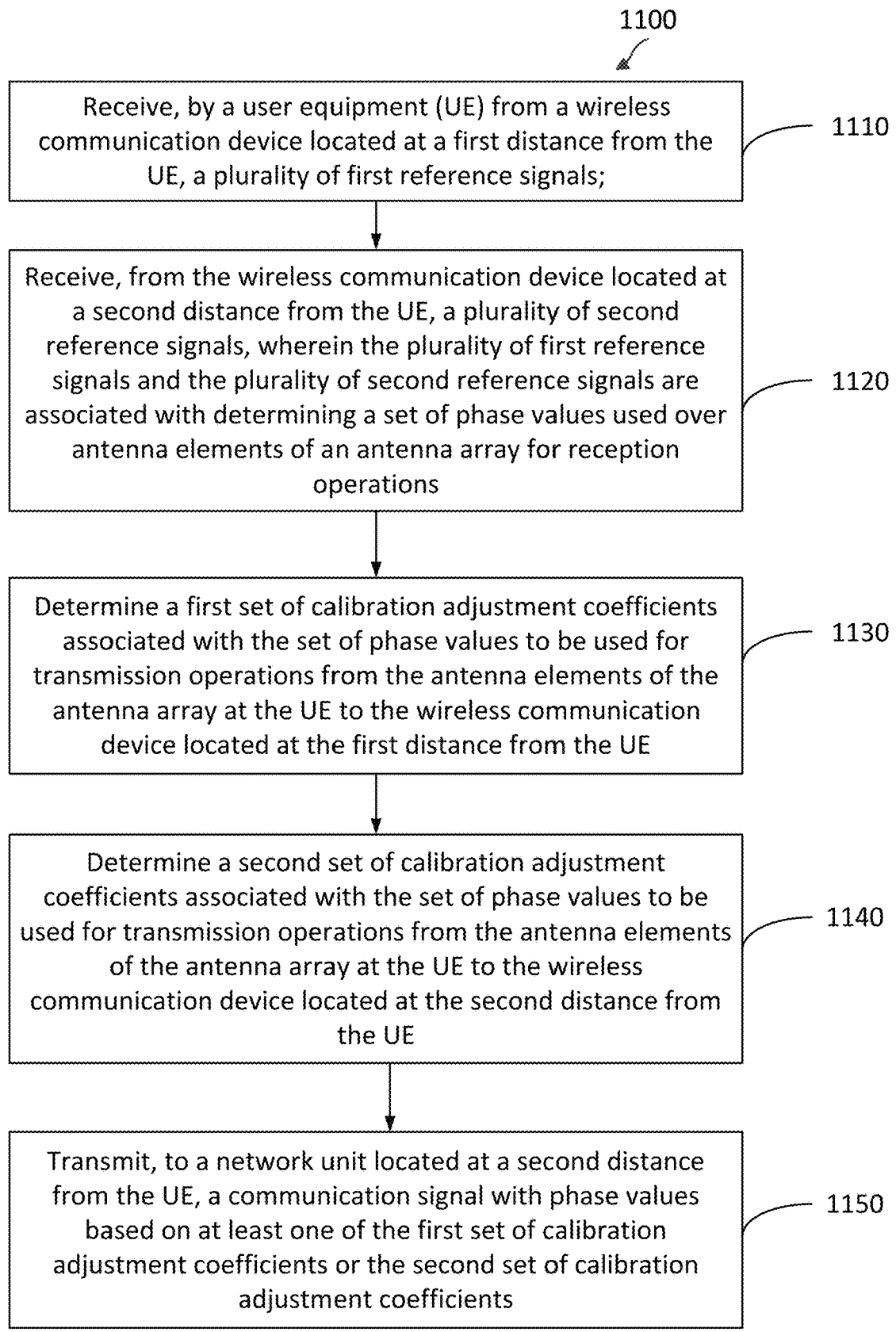
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the actions. For example, a wireless communication device, such as the UE 115 or the UE 800, may utilize one or more components, such as the processor 802, the memory 804, the near-field calibration module 808, the transceiver 810, the modem 812, and the one or more antennas 816, to execute aspects of method 1100. The method 1100 may employ similar mechanisms as in the networks 100 and 200 and the aspects and actions described with respect to FIGS. 3-7. As illustrated, the method 1100 includes a number of enumerated actions, but the method 1100 may include additional actions before, after, and in between the enumerated actions. In some aspects, one or more of the enumerated actions may be omitted or performed in a different order.

At action 1110, the method 1100 includes a user equipment (UE) (e.g., the UE 115, the UE 800) receiving a plurality of first reference signals from a wireless communication device located at a first distance from the UE. In this regard, the UE may receive the plurality of sounding reference signals (SRSs), demodulation reference signals (DMRSs), phase tracking reference signals (PTRSs), or other suitable first reference signals from the wireless communication device. In some aspects, the first distance may be based on near-field behavior of the antenna array. In this regard, the near-field may include the reactive near-field region and/or the radiating near-field region (e.g., Fresnel region).

At action 1120, the method 1100 includes the UE receiving a plurality of second reference signals from the wireless communication device located at a second distance from the UE. In this regard, the UE may receive the plurality of SRSs, DMRSs, PTRSs, or other suitable second reference signals from the wireless communication device. In some aspects, the second distance may be based on far-field behavior of the antenna array. The second distance may be greater than the first distance. The second distance may be based on a Fraunhofer distance. In this regard, the Fraunhofer distance may be defined as $2D^2/\lambda$, where D is the largest dimension of the antenna array and $\lambda$ is the wavelength of the reference signals.

In some aspects, the wireless communication device may comprise test equipment, a base station emulator, an antenna tester, a signal generator, antenna array calibration equipment, or other suitable wireless communication device. In some aspects, the plurality of first reference signals and second reference signals may be used to determine a set of phase values corresponding to antenna elements of an antenna array for receiving communication signals. The antenna array may be an antenna array of one or more antenna arrays used by the UE for reception of downlink communications and transmission of uplink communications to the network unit. In this regard, the downlink transmissions may include PDCCH communications, PDSCH communications, PBCH communications, and/or other suitable downlink communications. The uplink transmissions may include PUCCH communications, PUSCH communications, PRACH communications, and/or other suitable uplink communications.

In some aspects, the UE may include one or more antenna arrays at multiple positions in the UE. For example, the antenna arrays may be positioned along different edges (e.g., sides) of the UE for spatial diversity. The antenna arrays may be positioned parallel and/or orthogonal to one another. Each antenna array may include multiple antenna elements. For example, each antenna array may include a single row of antenna elements and/or multiple rows of antenna elements.

In some aspects, the UE may receive the first reference signals and the second reference signals in an anechoic chamber. The UE and the wireless communication device may be set up in the anechoic chamber in order to calibrate the antenna array using first reference signals transmitted over the first distance (e.g., the near-field distance) and second reference signals transmitted over the second distance (e.g., the far-field distance).

At action 1130, the method 1100 includes the UE determining a first set of calibration adjustment coefficients associated with the set of phase values. The calibration adjustment coefficients may be used for transmission operations from the UE to the wireless communication device located at the first distance (e.g., the near-field distance) from the UE.

At action 1140, the method 1100 includes the UE determining a second set of calibration adjustment coefficients associated with the set of phase values. The calibration adjustment coefficients may be used for transmission operations from the UE to the wireless communication device located at the second distance (e.g., the far-field distance) from the UE.

In some aspects, the calibration adjustment coefficients may be used by the UE to increase a signal quality of a transmitted beam for uplink transmissions. For example, signal processing over an array of antenna elements during beamforming may include adjusting a phase of signals corresponding to each of the antenna elements in the array. In some aspects, gain adjustments may be used for improving directionality of beams from the antenna elements, such as to control (e.g., reduce) side lobes and control (e.g., increase) the main lobe. Calibration adjustment coefficients used in beamforming may be particularly advantageous in millimeter wave communications to coherently combine energy and overcome high path, propagation, and blockage losses at the higher frequencies (e.g., FR2, FR3, FR4, FR5 frequencies) of millimeter wave communications. Upon performing gain and phase calibration for beamforming in the near-field and far-field, the antenna elements may operate with more accurate gain and/or phase settings for a more accurate beam pattern.

At action 1150, the method 1100 includes the UE transmitting a communication signal to a network unit (e.g., the network unit 900, the BS 105, the RU 240, the DU 230, and/or the CU 210) located at a second distance from the UE. In this regard, the communication signal may include a PUCCH communication, a PUSCH communication, a PRACH communication, and/or other suitable uplink communication(s). In some aspects, the UE may transmit the communication signal with phase values based on the first set of calibration adjustment coefficients and/or the second set of calibration adjustment coefficients. In this regard, the UE may transmit the communication signal to the network unit with phase values based on the first set of calibration adjustment coefficients when the UE is located at or about the first distance from the network unit. The UE may transmit the communication signal to the network unit with phase values based on the second set of calibration adjustment coefficients when the UE is located at or about the second distance from the network unit.

In some aspects, the UE may calibrate the phase values of the antenna array using the wireless communication device (e.g., antenna calibration equipment) in a test chamber (e.g., anechoic chamber) at the first distance (e.g., near-field distance) and the second distance (e.g., far-field distance) at a first frequency (e.g., FR1 frequency, FR2 frequency). In some aspects, the first set of calibration adjustment coefficients and the second set of calibration adjustment coefficients may be determined at the first frequency using the test chamber setup based on the test chamber being large enough to accommodate the UE and the wireless communication device (e.g., antenna calibration equipment) being separated by the second distance in the chamber. Since the far-field distance is based on the wavelength of the reference signals, the test chamber may not be large enough to separate the UE from the wireless communication device at the second distance at the second (higher) frequency.

The UE may then determine phase values for communicating with the network unit at a second frequency (e.g., an FR4 frequency) using a third set of calibration adjustment coefficients. The second frequency may be higher than the first frequency. The third set of calibration adjustment coefficients may be based on (e.g., extrapolated from) the first set of calibration adjustment coefficients and/or the second set of calibration adjustment coefficients.

In some aspects, the UE may receive the plurality of first reference signals using a subset of the antenna elements of the antenna array. Since the second distance (e.g., the far-field distance) is based on the largest dimension of the antenna array, using a subset of the elements may allow the subset of antenna elements to be calibrated in both the near-field and far-field in the test chamber. For example, referring to FIG. 5, the antenna array 308 may include an 8×8 array of antenna elements arrange in a row and column structure. The rows may be designated as rows R0 to R7. The columns may be designated as columns C0 to C7. The UE may calibrate the phase values based on the subset of antenna elements in rows R0 to R3 and columns C0 to C3. Although the present example includes using a subset of 16 antenna elements out of the total of 64 antenna elements, the present disclosure is not so limited and any number of antenna elements may be calibrated. The UE may then use the calibration adjustment coefficients determined for antenna elements in rows R0 to R3 and columns C0 to C3 and extrapolate them out to the entire antenna array in rows R0 to R7 and columns C0 to C7. The UE may transmit the communication signal to the network unit via all the antenna elements of the antenna array using the measured calibration adjustment coefficients determined for antenna elements in rows R0 to R3 and columns C0 to C3 and the extrapolated calibration adjustment coefficients for the rest of the antenna elements.

Further aspects of the present disclosure include the following:

Aspect 1 includes a method of wireless communication performed by a user equipment (UE), the method comprising receiving, from a wireless communication device located at a first distance from the UE, a plurality of reference signals, wherein the plurality of reference signals are associated with determining a set of phase values corresponding to antenna elements of an antenna array for reception operations; determining a first set of calibration adjustment coefficients associated with the set of phase values to be used for transmission operations from the antenna elements of the antenna array at the UE to the wireless communication device located at the first distance from the UE; and transmitting, to a network unit located at a second distance from the UE, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

Aspect 2 includes the method of aspect 1, wherein the distance adjustment factor comprises a value of zero.

Aspect 3 includes the method of any of aspects 1-2, wherein the distance adjustment factor is based on a resolution of a phase shifter of the UE.

Aspect 4 includes the method of any of aspects 1-3, wherein the second set of calibration adjustment coefficients are based on the first set of calibration adjustment coefficients and a common distance adjustment factor; and the common distance adjustment factor is at least one of an average of a plurality of distance adjustment factors; based on the second distance; or based on a reference signal received power (RSRP) associated with the communication signal.

Aspect 5 includes the method of any of aspects 1-4, wherein the second distance is greater than the first distance.

Aspect 6 includes the method of any of aspects 1-5, wherein the first distance is based on near-field behavior of the antenna array.

Aspect 7 includes the method of any of aspects 1-6, wherein the distance adjustment factor is further based on at least one of a temperature of the UE; a frequency range associated with the communication signal; a gain state associated with the antenna elements of the antenna array; or a difference between the first distance and the second distance.

Aspect 8 includes the method of any of aspects 1-7, further comprising determining a third set of calibration adjustment coefficients associated with a set of gain values to be used for the transmission operations, wherein the transmitting the communication signal comprises transmitting the communication signal with gain values based on a fourth set of calibration adjustment coefficients, wherein the fourth set of calibration adjustment coefficients are based on the third set of calibration adjustment coefficients and a second distance adjustment factor.

Aspect 9 includes the method of any of aspects 1-8, further comprising transmitting, to the network unit, an indicator indicating a self-calibration capability associated with the antenna elements of the antenna array; and self-calibrating one or more of the antenna elements of the antenna array.

Aspect 10 includes the method of any of aspects 1-9, further comprising receiving from the network unit, an indicator indicating the distance adjustment factor.

Aspect 11 includes the method of any of aspects 1-10, wherein the wireless communication device comprises measurement equipment; and the receiving the plurality of reference signals comprises receiving the plurality of reference signals in an anechoic chamber.

Aspect 12 includes a method of wireless communication performed by a user equipment (UE), the method comprising receiving, from a wireless communication device located at a first distance from the UE, a plurality of first reference signals; receiving, from the wireless communication device located at a second distance from the UE, a plurality of second reference signals, wherein the plurality of first reference signals and the plurality of second reference signals are associated with determining a set of phase values corresponding to antenna elements of an antenna array for reception operations; determining a first set of calibration adjustment coefficients associated with the set of phase values to be used for transmission operations from the antenna elements of the antenna array at the UE to the wireless communication device located at the first distance from the UE; determining a second set of calibration adjustment coefficients associated with the set of phase values to be used for transmission operations from the antenna elements of the antenna array at the UE to the wireless communication device located at the second distance from the UE; and transmitting, to a network unit located at a second distance from the UE, a communication signal with phase values based on at least one of the first set of calibration adjustment coefficients or the second set of calibration adjustment coefficients.

Aspect 13 includes the method of aspect 12, wherein: the receiving the plurality of first reference signals comprises receiving the plurality of first reference signals at a first frequency; the receiving the plurality of second reference signals comprises receiving the plurality of second reference signals at the first frequency; the transmitting the communication signal comprises transmitting the communication signal at a second frequency based on a third set of calibration adjustment coefficients extrapolated from at least one of the first set of calibration adjustment coefficients or the second set of calibration adjustment coefficients; and the second frequency is higher than the first frequency.

Aspect 14 includes the method of any of aspects 12-13, wherein the receiving the plurality of first reference signals comprises receiving the plurality of first reference signals using a subset of the antenna elements of the antenna array; the receiving the plurality of second reference signals comprises receiving the plurality of second reference signals using the subset of the antenna elements of the antenna array; and the transmitting the communication signal comprises transmitting the communication signal using all the antenna elements of the antenna array.

Aspect 15 includes the method of any of aspects 12-14, wherein the receiving the plurality of first reference signals comprises receiving the plurality of first reference signals at a first frequency in a subset of the antenna elements of the antenna array; the receiving the plurality of second reference signals comprises receiving the plurality of second reference signals at the first frequency in the subset of the antenna elements of the antenna array; and the transmitting the communication signal comprises transmitting the communication signal using all the antenna elements of the antenna array at a second frequency based on a third set of calibration adjustment coefficients extrapolated from at least one of the first set of calibration adjustment coefficients or the second set of calibration adjustment coefficients.

Aspect 16 includes a non-transitory computer-readable medium storing one or more instructions for wireless communication, the one or more instructions comprising one or more instructions that, when executed by one or more processors of a UE perform any one of aspects 1-11.

Aspect 17 includes a non-transitory computer-readable medium storing one or more instructions for wireless communication, the one or more instructions comprising one or more instructions that, when executed by one or more processors of a UE, cause the network unit to perform any one of aspects 12-15.

Aspect 18 includes a UE comprising one or more means to perform any one or more of aspects 1-11.

Aspect 19 includes a UE comprising one or more means to perform any one or more of aspects 12-15.

Aspect 20 includes a UE comprising a memory; a transceiver; and at least one processor coupled to the memory and the transceiver, wherein the UE is configured to perform any one or more of aspects 1-11.

Aspect 21 includes a UE comprising a memory; a transceiver; and at least one processor coupled to the memory and the transceiver, wherein the network unit is configured to perform any one or more of aspects 12-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a wireless communication device located at a first distance from the UE, a plurality of reference signals, wherein the plurality of reference signals are associated with determining a set of phase values corresponding to antenna elements of an antenna array for reception operations;
   determining a first set of calibration adjustment coefficients associated with the set of phase values to be used for transmission operations from the antenna elements of the antenna array at the UE to the wireless communication device located at the first distance from the UE; and
   transmitting, to a network unit located at a second distance from the UE, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

2. The method of claim 1, wherein the distance adjustment factor comprises a value of zero.

3. The method of claim 1, wherein the distance adjustment factor is based on a resolution of a phase shifter of the UE.

4. The method of claim 1, wherein:
   the second set of calibration adjustment coefficients are based on the first set of calibration adjustment coefficients and a common distance adjustment factor; and
   the common distance adjustment factor is at least one of:
   an average of a plurality of distance adjustment factors;
   based on the second distance; or
   based on a reference signal received power (RSRP) associated with the communication signal.

5. The method of claim 1, wherein the second distance is greater than the first distance.

6. The method of claim 1, wherein the first distance is based on near-field behavior of the antenna array.

7. The method of claim 1, wherein the distance adjustment factor is further based on at least one of:
   a temperature of the UE;
   a frequency range associated with the communication signal;
   a gain state associated with the antenna elements of the antenna array; or
   a difference between the first distance and the second distance.

8. The method of claim 1, further comprising:
   determining a third set of calibration adjustment coefficients associated with a set of gain values to be used for the transmission operations, wherein the transmitting the communication signal comprises transmitting the communication signal with gain values based on a fourth set of calibration adjustment coefficients, wherein the fourth set of calibration adjustment coefficients are based on the third set of calibration adjustment coefficients and a second distance adjustment factor.

9. The method of claim 1, further comprising:
   transmitting, to the network unit, an indicator indicating a self-calibration capability associated with the antenna elements of the antenna array; and
   self-calibrating one or more of the antenna elements of the antenna array.

10. The method of claim 1, further comprising:
    receiving from the network unit, an indicator indicating the distance adjustment factor.

11. The method of claim 1, wherein:
    the wireless communication device comprises measurement equipment; and
    the receiving the plurality of reference signals comprises receiving the plurality of reference signals in an anechoic chamber.

12. A method of wireless communication performed by a user equipment (UE), the method comprising:
    receiving, from a wireless communication device located at a first distance from the UE, a plurality of first reference signals;
    receiving, from the wireless communication device located at a second distance from the UE, a plurality of second reference signals, wherein the plurality of first reference signals and the plurality of second reference signals are associated with determining a set of phase values corresponding to antenna elements of an antenna array for reception operations;

determining a first set of calibration adjustment coefficients associated with the set of phase values to be used for transmission operations from the antenna elements of the antenna array at the UE to the wireless communication device located at the first distance from the UE;

determining a second set of calibration adjustment coefficients associated with the set of phase values to be used for transmission operations from the antenna elements of the antenna array at the UE to the wireless communication device located at the second distance from the UE; and transmitting, to a network unit located at a second distance from the UE, a communication signal with phase values based on at least one of the first set of calibration adjustment coefficients or the second set of calibration adjustment coefficients.

13. The method of claim 12, wherein:

the receiving the plurality of first reference signals comprises receiving the plurality of first reference signals at a first frequency;

the receiving the plurality of second reference signals comprises receiving the plurality of second reference signals at the first frequency;

the transmitting the communication signal comprises transmitting the communication signal at a second frequency based on a third set of calibration adjustment coefficients extrapolated from at least one of the first set of calibration adjustment coefficients or the second set of calibration adjustment coefficients; and the second frequency is higher than the first frequency.

14. The method of claim 12, wherein:

the receiving the plurality of first reference signals comprises receiving the plurality of first reference signals using a subset of the antenna elements of the antenna array;

the receiving the plurality of second reference signals comprises receiving the plurality of second reference signals using the subset of the antenna elements of the antenna array; and the transmitting the communication signal comprises transmitting the communication signal using all the antenna elements of the antenna array.

15. The method of claim 12, wherein:

the receiving the plurality of first reference signals comprises receiving the plurality of first reference signals at a first frequency in a subset of the antenna elements of the antenna array;

the receiving the plurality of second reference signals comprises receiving the plurality of second reference signals at the first frequency in the subset of the antenna elements of the antenna array; and the transmitting the communication signal comprises transmitting the communication signal using all the antenna elements of the antenna array at a second frequency based on a third set of calibration adjustment coefficients extrapolated from at least one of the first set of calibration adjustment coefficients or the second set of calibration adjustment coefficients.

16. A user equipment (UE) comprising:

a memory;

a transceiver; and at least one processor coupled to the memory and the transceiver, wherein the UE is configured to:

receive, from a wireless communication device located at a first distance from the UE, a plurality of reference signals, wherein the plurality of reference signals are associated with determining a set of phase values corresponding to antenna elements of an antenna array for reception operations;

determine a first set of calibration adjustment coefficients associated with the set of phase values to be used for transmission operations from the antenna elements of the antenna array at the UE to the wireless communication device located at the first distance from the UE; and transmit, to a network unit located at a second distance from the UE, a communication signal with phase values based on a second set of calibration adjustment coefficients, wherein the second set of calibration adjustment coefficients are based on the first set of calibration adjustment coefficients and a distance adjustment factor based on the first and second distances of the wireless communication device and the network unit from the UE, respectively.

17. The UE of claim 16, wherein the distance adjustment factor comprises a value of zero.

18. The UE of claim 16, wherein the distance adjustment factor is based on a resolution of a phase shifter of the UE.

19. The UE of claim 16, wherein:

the second set of calibration adjustment coefficients are based on the first set of calibration adjustment coefficients and a common distance adjustment factor; and the common distance adjustment factor is at least one of:

an average of a plurality of distance adjustment factors;

based on the second distance; or based on a reference signal received power (RSRP) associated with the communication signal.

20. The UE of claim 16, wherein the second distance is greater than the first distance.

21. The UE of claim 16, wherein the first distance is based on near-field behavior of the antenna array.

22. The UE of claim 16, wherein the distance adjustment factor is further based on at least one of:

a temperature of the UE;

a frequency range associated with the communication signal;

a gain state associated with the antenna elements of the antenna array; or a difference between the first distance and the second distance.

23. The UE of claim 16, wherein the UE is further configured to:

determine a third set of calibration adjustment coefficients associated with a set of gain values to be used for the transmission operations; and transmit the communication signal with gain values based on a fourth set of calibration adjustment coefficients, wherein the fourth set of calibration adjustment coefficients are based on the third set of calibration adjustment coefficients and a second distance adjustment factor.

24. The UE of claim 16, wherein the UE is further configured to:
- transmit, to the network unit, an indicator indicating a self-calibration capability associated with the antenna elements of the antenna array; and
- self-calibrate one or more of the antenna elements of the antenna array.

25. The UE of claim 16, wherein the UE is further configured to:
- receive from the network unit, an indicator indicating the distance adjustment factor.

26. The UE of claim 16, wherein:
- the wireless communication device comprises measurement equipment; and
- the receiving the plurality of reference signals comprises receiving the plurality of reference signals in an anechoic chamber.

27. A user equipment (UE) comprising:
- a memory;
- a transceiver; and
- at least one processor coupled to the memory and the transceiver, wherein the UE is configured to:
- receive, from a wireless communication device located at a first distance from the UE, a plurality of first reference signals;
- receive, from the wireless communication device located at a second distance from the UE, a plurality of second reference signals, wherein the plurality of first reference signals and the plurality of second reference signals are associated with determining a set of phase values corresponding to antenna elements of an antenna array for reception operations;
- determine a first set of calibration adjustment coefficients associated with the set of phase values to be used for transmission operations from the antenna elements of the antenna array at the UE to the wireless communication device located at the first distance from the UE;
- determine a second set of calibration adjustment coefficients associated with the set of phase values to be used for transmission operations from the antenna elements of the antenna array at the UE to the wireless communication device located at the second distance from the UE; and
- transmit, to a network unit located at a second distance from the UE, a communication signal with phase values based on at least one of the first set of calibration adjustment coefficients or the second set of calibration adjustment coefficients.

28. The UE of claim 27, wherein the UE is further configured to:
- receive the plurality of first reference signals at a first frequency;
- receive the plurality of second reference signals at the first frequency;
- transmit the communication signal at a second frequency based on a third set of calibration adjustment coefficients extrapolated from at least one of the first set of calibration adjustment coefficients or the second set of calibration adjustment coefficients; and
- wherein the second frequency is higher than the first frequency.

29. The UE of claim 27, wherein the UE is further configured to:
- receive the plurality of first reference signals using a subset of the antenna elements of the antenna array;
- receive the plurality of second reference signals using the subset of the antenna elements of the antenna array; and
- transmit the communication signal using all the antenna elements of the antenna array.

30. The UE of claim 27, wherein the UE is further configured to:
- receive the plurality of first reference signals at a first frequency in a subset of the antenna elements of the antenna array;
- receive the plurality of second reference signals at the first frequency in the subset of the antenna elements of the antenna array; and
- transmit the communication signal using all the antenna elements of the antenna array at a second frequency based on a third set of calibration adjustment coefficients extrapolated from at least one of the first set of calibration adjustment coefficients or the second set of calibration adjustment coefficients.

* * * * *